US011530662B2

(12) United States Patent
Hashimoto et al.

(10) Patent No.: US 11,530,662 B2
(45) Date of Patent: *Dec. 20, 2022

(54) METHOD OF GENERATING VEHICLE CONTROL DATA, VEHICLE CONTROL DEVICE, AND VEHICLE CONTROL SYSTEM

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/024,071

(22) Filed: Sep. 17, 2020

(65) Prior Publication Data

US 2021/0115866 A1    Apr. 22, 2021

(30) Foreign Application Priority Data

Oct. 18, 2019  (JP) .............................. JP2019-191098

(51) Int. Cl.
*F02D 41/24* (2006.01)
*F02D 41/04* (2006.01)
(Continued)

(52) U.S. Cl.
CPC .............. *F02D 41/04* (2013.01); *F01N 3/021* (2013.01); *F02D 41/0007* (2013.01); *F02P 5/15* (2013.01); *F02D 2041/002* (2013.01)

(58) Field of Classification Search
CPC .. F02D 41/24; F02D 41/2425; F02D 2200/50; F02D 2200/101;
(Continued)

(56) References Cited

U.S. PATENT DOCUMENTS 5,410,477 A    4/1995  Ishii et al.
6,549,815 B1   4/2003  Kaji
(Continued)

FOREIGN PATENT DOCUMENTS

DE    197 52 035 A1   8/1998
ES    2 286 958 A1   12/2007
(Continued)

OTHER PUBLICATIONS

Office Action dated Jul. 19, 2021 in co-pending U.S. Appl. No. 17/063,203, 8 pages.
(Continued)

*Primary Examiner* — John Kwon
(74) *Attorney, Agent, or Firm* — Oblon, McClelland, Maier & Neustadt, L.L.P.

(57) ABSTRACT

A method of generating vehicle control data is provided. The method is executed using a processor and a storage device and includes: storing first data that prescribe a relationship between a state of a vehicle and an action variable that indicates an action related to an operation of an electronic device; acquiring a detection value from a sensor that detects the state of the vehicle; operating the electronic device; calculating a reward, on the basis of the acquired detection value; in a case where a predetermined condition is met, updating the first data using, as inputs to update mapping determined in advance, the state of the vehicle, a value of the action variable, and the reward; and in a case where the state of the vehicle does not meet the predetermined condition, obtaining second data by adapting the relationship between the state of the vehicle and the action variable.

11 Claims, 13 Drawing Sheets

(51) Int. Cl.
*F02P 5/15* (2006.01)
*F01N 3/021* (2006.01)
*F02D 41/00* (2006.01)

(58) Field of Classification Search
CPC ...... F02D 2200/0625; F02D 2200/602; B60W 10/06; Y02T 10/40; G06Q 30/018; G07C 5/0808; G06N 20/00
USPC .................................................. 701/114, 115
See application file for complete search history.

(56) References Cited

U.S. PATENT DOCUMENTS

| | | | |
|---|---|---|---|
| 6,837,217 | B1 | 1/2005 | Hoshino et al. |
| 11,248,553 | B2 | 2/2022 | Hashimoto et al. |
| 2002/0157639 | A1 | 10/2002 | Kidokoro et al. |
| 2003/0055551 | A1 | 3/2003 | Weber et al. |
| 2004/0098197 | A1 | 5/2004 | Matsumoto et al. |
| 2010/0204899 | A1 | 8/2010 | Serres |
| 2018/0066593 | A1 | 3/2018 | Uezono et al. |
| 2018/0072317 | A1 | 3/2018 | Hiwatashi et al. |
| 2018/0086349 | A1 | 3/2018 | Hiwatashi et al. |
| 2019/0242319 | A1 | 8/2019 | Matsumoto et al. |
| 2019/0360421 | A1 | 11/2019 | Cancellieri et al. |
| 2020/0263581 | A1 | 8/2020 | Muto et al. |
| 2020/0263618 | A1 | 8/2020 | Muto et al. |
| 2021/0033039 | A1 | 2/2021 | Hashimoto et al. |
| 2021/0056781 | A1* | 2/2021 | Hashimoto .......... G07C 5/0841 |
| 2021/0114581 | A1* | 4/2021 | Hashimoto ....... B60W 50/0098 |
| 2021/0114596 | A1 | 4/2021 | Hashimoto et al. |
| 2021/0114608 | A1 | 4/2021 | Hashimoto et al. |
| 2021/0115870 | A1 | 4/2021 | Hashimoto et al. |
| 2021/0115871 | A1 | 4/2021 | Hashimoto et al. |
| 2021/0189990 | A1* | 6/2021 | Hashimoto ......... F02D 41/0052 |
| 2021/0217254 | A1* | 7/2021 | Hashimoto ........... B60W 40/00 |

FOREIGN PATENT DOCUMENTS

| | | |
|---|---|---|
| JP | 4-293626 A | 10/1992 |
| JP | 06-248997 A | 9/1994 |
| JP | 10-254505 A | 9/1998 |
| JP | 2000-250604 A | 9/2000 |
| JP | 2009-19523 A | 1/2009 |
| JP | 2009-167968 A | 7/2009 |
| JP | 2016-6327 A | 1/2016 |
| JP | 2016-169686 A | 9/2016 |
| JP | 2019-519851 A | 7/2019 |
| JP | 2019-144748 A | 8/2019 |
| WO | WO 2018/084324 A1 | 5/2018 |
| WO | WO 2018/105703 A1 | 6/2018 |

OTHER PUBLICATIONS

Hu Xiasong et al., "Reinforcement Learning for Hybrid and Plug-In Hybrid Electric Vehicle Energy Management: Recent Advances and Prospects", IEEE Industrial Electronics Magazine, IEEE, US. vol. 13, No. 3, Sep. 24, 2019 (Sep. 24, 2019), pp. 16-25.

* cited by examiner

METHOD OF GENERATING VEHICLE CONTROL DATA, VEHICLE CONTROL DEVICE, AND VEHICLE CONTROL SYSTEM

CROSS-REFERENCE TO RELATED APPLICATION

This application claims priority to Japanese Patent Application No. 2019-191098 filed on Oct. 18, 2019, incorporated herein by reference in its entirety.

BACKGROUND

1. Technical Field

The present disclosure relates to a method of generating vehicle control data, a vehicle control device, and a vehicle control system.

2. Description of Related Art

Japanese Unexamined Patent Application Publication No. 2016-6327 (JP 2016-6327 A), for example, describes a control device that operates a throttle valve, which is an operable portion of an internal combustion engine mounted on a vehicle, on the basis of a value obtained by filtering an operation amount of an accelerator pedal.

SUMMARY

The above filtering is required to set an operation amount of the throttle valve of the internal combustion engine, which is mounted on the vehicle, to an appropriate operation amount in accordance with the operation amount of the accelerator pedal. Hence, it is necessary that an expert should spend a lot of man-hours to adapt the operation amount. Thus, an expert has hitherto spent a lot of man-hours to optimize an operation amount etc. of an electronic device in the vehicle in accordance with the state of the vehicle.

Aspects of the present disclosure and the functions and effects thereof will be described below.

A first aspect of the present disclosure provides a method of generating vehicle control data, the method being executed using a processor and a storage device. The method of generating vehicle control data includes: storing, in the storage device, first data that prescribe a relationship between a state of a vehicle and an action variable that indicates an action related to an operation of an electronic device in the vehicle for a case where the state of the vehicle meets a predetermined condition; by use of the processor, acquiring a detection value from a sensor that detects the state of the vehicle; by use of the processor, operating the electronic device; in a case where the predetermined condition is met, by use of the processor, calculating a reward such that a large reward is given in a case where a characteristic of the vehicle meets a criterion, on the basis of the acquired detection value, compared to a case where the characteristic does not meet the criterion; in the case where the predetermined condition is met, by use of the processor, updating the first data using, as inputs to update mapping determined in advance, the state of the vehicle which is based on the acquired detection value, a value of the action variable which is used to operate the electronic device, and the reward corresponding to the operation, the update mapping outputting the first data which have been updated so as to increase an expected profit for the reward for a case where the electronic device is operated in accordance with the first data; and in a case where the state of the vehicle does not meet the predetermined condition, by use of the processor, obtaining second data by adapting the relationship between the state of the vehicle and the action variable without calculating the reward and updating the first data.

With the method described above, it is possible to grasp what reward can be obtained through an operation of the electronic device by calculating a reward corresponding to such an operation in the case where the predetermined condition is met. The relationship between the state of the vehicle and the action variable can be set by updating the first data using update mapping which has been subjected to reinforcement learning on the basis of the reward. Thus, the number of man-hours required for an expert in setting the relationship between the state of the vehicle and the action variable can be reduced. Moreover, the first data are updated through reinforcement learning in the case where the predetermined condition is met, and the second data are adapted not through reinforcement learning in the case where the predetermined condition is not met. Thus, reinforcement learning can be utilized under a condition under which the effect of reducing the number of man-hours spent by an expert is distinguished, by determining a condition under which the number of man-hours spent by an expert is large as the predetermined condition.

In the first aspect described above, the predetermined condition may be a condition of being in transient operation. The number of man-hours spent by an expert in order to adapt the relationship between the state of the vehicle and the action variable tends to be large during transient operation compared to during steady operation. Thus, with the method described above, the number of man-hours required for an expert can be reduced effectively by automatically executing, through reinforcement learning, adaptation of the relationship between the state of the vehicle and the action variable under a condition under which the number of man-hours spent by an expert is particularly large, by determining a condition of being in transient operation as the predetermined condition.

In the first aspect described above, the vehicle may be a vehicle on which an internal combustion engine is mounted; the electronic device may be configured to operate the internal combustion engine; and the first data may prescribe a relationship between the state of the vehicle and an operation amount of the internal combustion engine as the action variable.

In general, an internal combustion engine includes a large number of electronic devices, and has a large number of requirements such as the exhaust characteristics, the fuel consumption rate, and the drivability, and thus tends to require a large number of man-hours for an expert to adapt the relationship between the state of the vehicle and the operation amounts of the electronic devices as action variables. Thus, with the method described above, the number of man-hours spent by an expert can be reduced effectively by using reinforcement learning to adapt the relationship between the state of the vehicle and the operation amounts of the electronic devices as action variables.

In the first aspect described above, the method may further include, by use of the processor, generating, on the basis of the updated first data, control mapping data to which the state of the vehicle is input and which output a value of the action variable that maximizes the expected profit by making one-to-one correspondence between the state of the vehicle and the value of the action variable that maximizes the expected profit.

With the method described above, the control mapping data are generated on the basis of the first data which have been learned through reinforcement learning. Therefore, it is possible to conveniently set a value of the action variable that maximizes the expected profit on the basis of the state of the vehicle by installing the control mapping data in the control device.

In the first aspect described above, the method may further include storing the second data in the storage device, and the operating may include, by use of the processor, executing a first operation process of operating the electronic device in accordance with a value of the action variable that matches the state of the vehicle which is based on the acquired detection value on the basis of the first data in the case where the predetermined condition is met, and executing a second operation process of operating the electronic device in accordance with a value of the action variable that matches the state of the vehicle which is based on the acquired detection value on the basis of the second data in a case where the predetermined condition is not met.

With the method described above, in the case where the predetermined condition is met, the value of the action variable is set on the basis of the first data which have been learned through reinforcement learning, and the electronic device is operated on the basis of the set value, which allows the electronic device to be operated so as to increase the expected profit. In the case where the predetermined condition is met, moreover, the relationship prescription data are updated through a reward calculation process, and thus opportunities to update the relationship prescription data can be increased compared to the case where update is not performed in accordance with the scene in which a user drives the vehicle.

A second aspect of the present disclosure provides a vehicle control device including: a storage device configured to store first data and second data that prescribe a relationship between a state of a vehicle and an action variable which is a variable related to an operation of an electronic device in the vehicle; and a processor configured to acquire a detection value from a sensor that detects the state of the vehicle, operate the electronic device, calculate a reward such that a large reward is given in a case where a characteristic of the vehicle meets a criterion, on the basis of the acquired detection value, compared to a case where the characteristic does not meet the criterion, in a case where the state of the vehicle meets a predetermined condition, and update the first data using, as inputs to update mapping determined in advance, the state of the vehicle which is based on the acquired detection value, a value of the action variable which is used to operate the electronic device, and the reward corresponding to the operation in a case where the state of the vehicle meets the predetermined condition, in which: the update mapping outputs the first data which have been updated so as to increase an expected profit for the reward for a case where the electronic device is operated in accordance with the first data; the processor is configured to execute a first operation process of operating the electronic device in accordance with a value of the action variable that matches the state of the vehicle which is based on the acquired detection value on the basis of the first data in a case where the predetermined condition is met in operating the electronic device; and the processor is configured to execute a second operation process of operating the electronic device in accordance with a value of the action variable that matches the state of the vehicle which is based on the acquired detection value on the basis of the second data in the case where the predetermined condition is not met in operating the electronic device.

With the configuration described above, it is possible to grasp what reward can be obtained through an operation of the electronic device by calculating a reward corresponding to such an operation in the case where the predetermined condition is met. The relationship between the state of the vehicle and the action variable can be set by updating the first data using update mapping which has been subjected to reinforcement learning on the basis of the reward. Thus, the number of man-hours required for an expert in setting the relationship between the state of the vehicle and the action variable to be appropriate for travel of the vehicle can be reduced. Moreover, the first data are updated through reinforcement learning in the case where the predetermined condition is met, and therefore reinforcement learning can be utilized under a condition under which the effect of reducing the number of man-hours spent by an expert is distinguished, by determining a condition under which the number of man-hours spent by an expert is large as the predetermined condition.

A third aspect of the present disclosure provides a vehicle control system including: a storage device configured to store first data and second data that prescribe a relationship between a state of a vehicle and an action variable which is a variable related to an operation of an electronic device in the vehicle; a first processor mounted on the vehicle; and a second processor disposed outside the vehicle.

The first processor is configured to acquire a detection value from a sensor that detects the state of the vehicle; the first processor is configured to operate the electronic device; the first processor or the second processor is configured to calculate a reward such that a large reward is given in a case where a characteristic of the vehicle meets a criterion, on the basis of the acquired detection value, compared to a case where the characteristic does not meet the criterion, in a case where the state of the vehicle meets a predetermined condition; and the second processor is configured to update the first data using, as inputs to update mapping determined in advance, the state of the vehicle which is based on the acquired detection value, a value of the action variable which is used to operate the electronic device, and the reward corresponding to the operation in the case where the state of the vehicle meets the predetermined condition.

The update mapping outputs the first data which have been updated so as to increase an expected profit for the reward for a case where the electronic device is operated in accordance with the first data; the first processor is configured to execute a first operation process of operating the electronic device in accordance with a value of the action variable that matches the state of the vehicle which is based on the acquired detection value on the basis of the first data in a case where the predetermined condition is met in operating the electronic device; and the first processor is configured to execute a second operation process of operating the electronic device in accordance with a value of the action variable that matches the state of the vehicle which is based on the acquired detection value on the basis of the second data in a case where the predetermined condition is not met in operating the electronic device.

With the configuration described above, update is executed by the second processor, and thus the computation load on the first processor can be reduced compared to the case where update is executed by the first processor.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A method of generating vehicle control data, a vehicle control device, and a vehicle control system according to an embodiment will be described below with reference to the drawings.

First Embodiment

Figure 1:
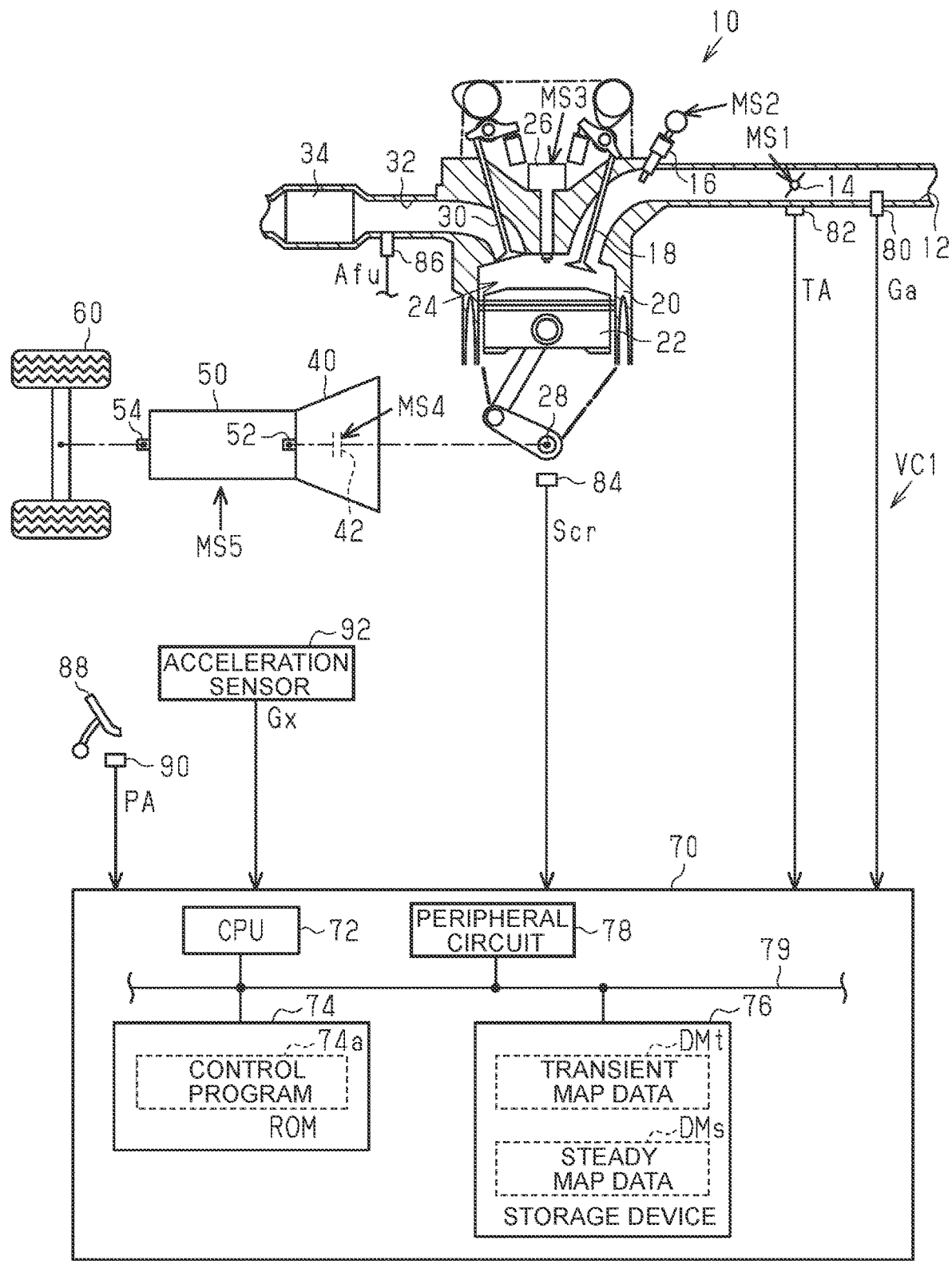
FIG. 1 illustrates the configuration of a drive system and a control device according to a first embodiment.

FIG. 1 illustrates the configuration of a drive system and a control device of a vehicle VC1 according to the present embodiment. As illustrated in FIG. 1, a suction passage 12 of an internal combustion engine 10 is provided with a throttle valve 14 and a fuel injection valve 16 which are arranged in this order from the upstream side. Air suctioned into the suction passage 12 and fuel injected from the fuel injection valve 16 flow into a combustion chamber 24 defined by a cylinder 20 and a piston 22 as a suction valve 18 opens. A mixture of the fuel and the air is combusted in the combustion chamber 24 as an ignition device 26 discharges a spark, and energy generated through combustion is converted into rotational energy of a crankshaft 28 via the piston 22. The mixture which has been combusted is discharged as exhaust to an exhaust passage 32 as an exhaust valve 30 opens. The exhaust passage 32 is provided with a catalyst 34 which serves as a post-processing device that purifies the exhaust.

An input shaft 52 of a speed change device 50 can be mechanically coupled to the crankshaft 28 via a torque converter 40 with a lock-up clutch 42. The speed change device 50 is a device that varies a speed ratio which is the ratio between the rotational speed of the input shaft 52 and the rotational speed of an output shaft 54. Drive wheels 60 are mechanically coupled to the output shaft 54.

A control device 70 controls the internal combustion engine 10, and operates electronic devices of the internal combustion engine 10 such as the throttle valve 14, the fuel injection valve 16, and the ignition device 26 in order to control torque, the exhaust component ratio, etc. which are control amounts of the internal combustion engine 10. The control device 70 also controls the torque converter 40, and operates the lock-up clutch 42 in order to control the state of engagement of the lock-up clutch 42. The control device 70 also controls the speed change device 50, and operates the speed change device 50 in order to control the speed ratio which is a control amount of the speed change device 50. In FIG. 1, operation signals MS1 to MS5 for the throttle valve 14, the fuel injection valve 16, the ignition device 26, the lock-up clutch 42, and the speed change device 50, respectively, are indicated.

In order to control the control amounts, the control device 70 references a suction air amount Ga detected by an airflow meter 80, an opening degree (throttle opening degree TA) of the throttle valve 14 detected by a throttle sensor 82, and an output signal Scr from a crank angle sensor 84. The control device 70 also references a detection value Afu from an air-fuel ratio sensor 86 provided upstream of the catalyst 34, a depression amount (accelerator operation amount PA) of an accelerator pedal 88 detected by an accelerator sensor 90, and an acceleration Gx in the front-rear direction of the vehicle VC1 detected by an acceleration sensor 92.

The control device 70 includes a CPU 72, a ROM 74, a non-volatile memory (storage device 76) that is electrically rewritable, and a peripheral circuit 78, which can communicate with each other via a local network 79. The peripheral circuit 78 includes a circuit that generates a clock signal that prescribes internal operation, a power source circuit, a reset circuit, etc.

The ROM 74 stores a control program 74a. Meanwhile, the storage device 76 stores steady map data DMs and transient map data DMt. The steady map data DMs are composed of map data that include the accelerator operation amount PA and a rotational speed NE as input variables and a command value (throttle opening degree command value TA*) for the throttle opening degree TA as an output variable, and map data that include the rotational speed NE and a charging efficiency η as input variables and a reference ignition timing abse as an output variable. The transient map data DMt are composed of map data that include chronological data on the accelerator operation amount PA as an input variable and the throttle opening degree command value TA* as an output variable, and map data that include chronological data on the accelerator operation amount PA as an input variable and a retardation amount aop with respect to the reference ignition timing abse as an output variable. The reference ignition timing abse is one of an MBT ignition timing and a knock limit point that is on the retarded side. The MBT ignition timing is the ignition timing (maximum torque ignition timing) at which maximum torque is obtained. The knock limit point is the limit value of advancement of the ignition timing at which knocking can be within the allowable level under the best condition assumed when high-octane fuel with a high knock limit is used.

Figure 2:
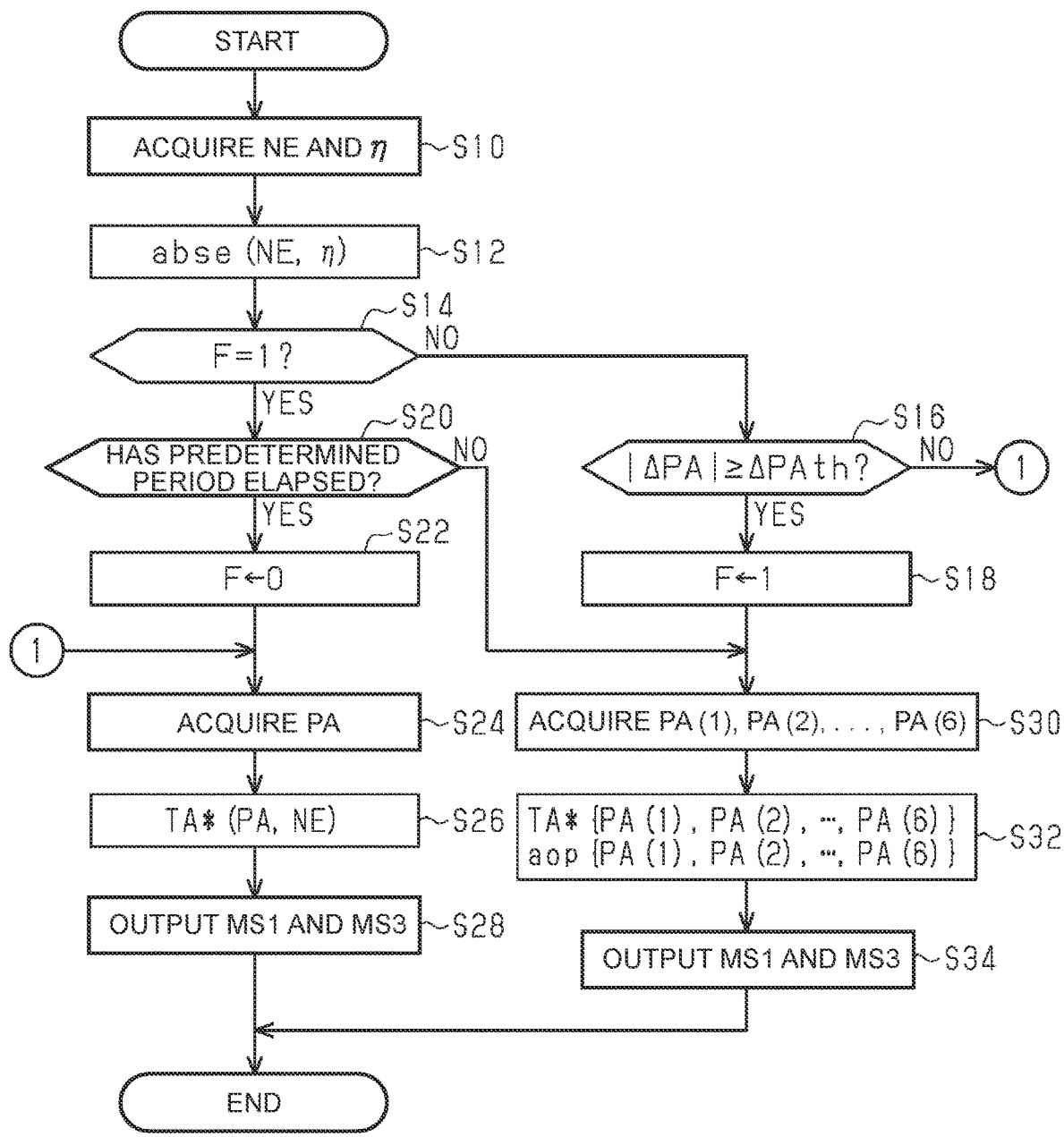
FIG. 2 is a flowchart illustrating the procedures of processes executed by the control device according to the embodiment.

The map data are a set of data that includes discrete values of the input variables and values of the output variables corresponding to the values of the input variables. FIG. 2 illustrates the procedures of processes executed by the control device 70 according to the present embodiment. The processes indicated in FIG. 2 are implemented by the CPU 72 executing the control program 74a, which is stored in the ROM 74, repeatedly at predetermined periods, for example. In the following, the respective step numbers of the processes are indicated by numbers preceded by the letter "S".

In the sequence of processes indicated in FIG. 2, the CPU 72 first acquires a rotational speed NE and a charging efficiency η (S10). The rotational speed NE is calculated by the CPU 72 on the basis of the output signal Scr. Meanwhile, the charging efficiency η is calculated by the CPU 72 on the basis of the rotational speed NE and the suction air amount Ga. Next, the CPU 72 performs map computation of the reference ignition timing abse using the map data which are prescribed by the steady map data DMs and which include the reference ignition timing abse as an output variable and using the rotational speed NE and the charging efficiency η as input variables (S12). The map computation may be a process of deriving, in the case where the value of the input variable coincides with any of the values of the input variable in the map data, the corresponding value of the output variable in the map data as the computation result, and deriving, in the case where the value of the input variable does not coincide with any of the values of the input variable in the map data, a value interpolated between a plurality of values of the output variable included in the map data as the computation result, for example.

The CPU 72 determines whether a transition flag F is "1" (S14). The transition flag F indicates that transient operation is performed in the case where the transition flag F is "1", and that transient operation is not performed in the case where the transition flag F is "0". In the case where it is determined that the transition flag F is "0" (S14: NO), the CPU 72 determines whether the absolute value of an amount of variation ΔPA in the accelerator operation amount PA per unit time is equal to or more than a predetermined amount ΔPAth (S16). The amount of variation ΔPA may be the difference between the latest accelerator operation amount PA at the timing of execution of the process in S16 and the accelerator operation amount PA a unit time earlier than such timing, for example.

In the case where it is determined that the absolute value of the amount of variation ΔPA is equal to or more than the predetermined amount ΔPAth (S16: YES), the CPU 72 substitutes "1" into the transition flag F (S18). In the case where it is determined that the transition flag F is "1" (S14: YES), on the contrary, the CPU 72 determines whether a predetermined period has elapsed since an affirmative determination is made in the process in S16 (S20). The predetermined period is a period until a state in which the absolute value of the amount of variation ΔPA in the accelerator operation amount PA per unit time is equal to or less than a prescribed amount that is less than the predetermined amount ΔPAth continues for a predetermined time. In the case where it is determined that the predetermined period has elapsed (S20: YES), the CPU 72 substitutes "0" into the transition flag F (S22).

In the case where the process in S22 is completed or in the case where a negative determination is made in the process in S16, the CPU 72 acquires the accelerator operation amount PA (S24). The CPU 72 performs map computation of the throttle opening degree command value TA* using the accelerator operation amount PA and the rotational speed NE as the input variables of the map data which are prescribed by the steady map data DMs and which include the throttle opening degree command value TA* as an output variable (S26). The map computation may be a process of deriving, in the case where the value of the input variable coincides with any of the values of the input variable in the map data, the corresponding value of the output variable in the map data as the computation result, and deriving, in the case where the value of the input variable does not coincide with any of the values of the input variable in the map data, a value interpolated between a plurality of values of the output variable included in the map data as the computation result, for example.

The CPU 72 outputs the operation signal MS1 to the throttle valve 14 in order to operate the throttle valve 14 on the basis of the throttle opening degree command value TA*, and outputs the operation signal MS3 to the ignition device 26 in order to operate the ignition device 26 on the basis of the reference ignition timing abse (S28).

In the case where the process in S18 is completed or in the case where a negative determination is made in the process in S20, on the contrary, the CPU 72 acquires chronological data composed of six sampled values "PA (1), PA (2), . . . , PA (6)" of the accelerator operation amount PA (S30). The sampled values which constitute the chronological data have been sampled at different timings. In the present embodiment, the chronological data are constituted from six sampled values that have been sampled at constant sampling periods and that are chronologically adjacent to each other.

The CPU 72 performs map computation of the throttle opening degree command value TA* and the retardation amount aop on the basis of the transient map data DMt (S32). That is, the CPU 72 performs map computation of the throttle opening degree command value TA* using the chronological data described above as the input variable of the map data which are prescribed by the transient map data DMt and which include the throttle opening degree command value TA* as an output variable. The CPU 72 also performs map computation of the retardation amount aop using the chronological data described above as the input variable of the map data which are prescribed by the transient map data DMt and which include the retardation amount aop as an output variable.

The CPU 72 outputs the operation signal MS1 to the throttle valve 14 to operate the throttle opening degree TA, and outputs the operation signal MS3 to the ignition device 26 to operate the ignition timing (S34). The CPU 72 sets the ignition timing on the basis of a timing obtained by retarding the reference ignition timing abse by the retardation amount aop. Specifically, in the case where known knock control (KCS) etc. is performed, for example, the CPU 72 determines the ignition timing by feedback-correcting, through KCS, a value obtained by retarding the reference ignition timing abse using the retardation amount aop. In the present embodiment, the throttle opening degree TA is feedback-controlled to the throttle opening degree command value TA*, and thus the operation signal MS1 may take different values even if the throttle opening degree command value TA* is the same.

Figure 3:
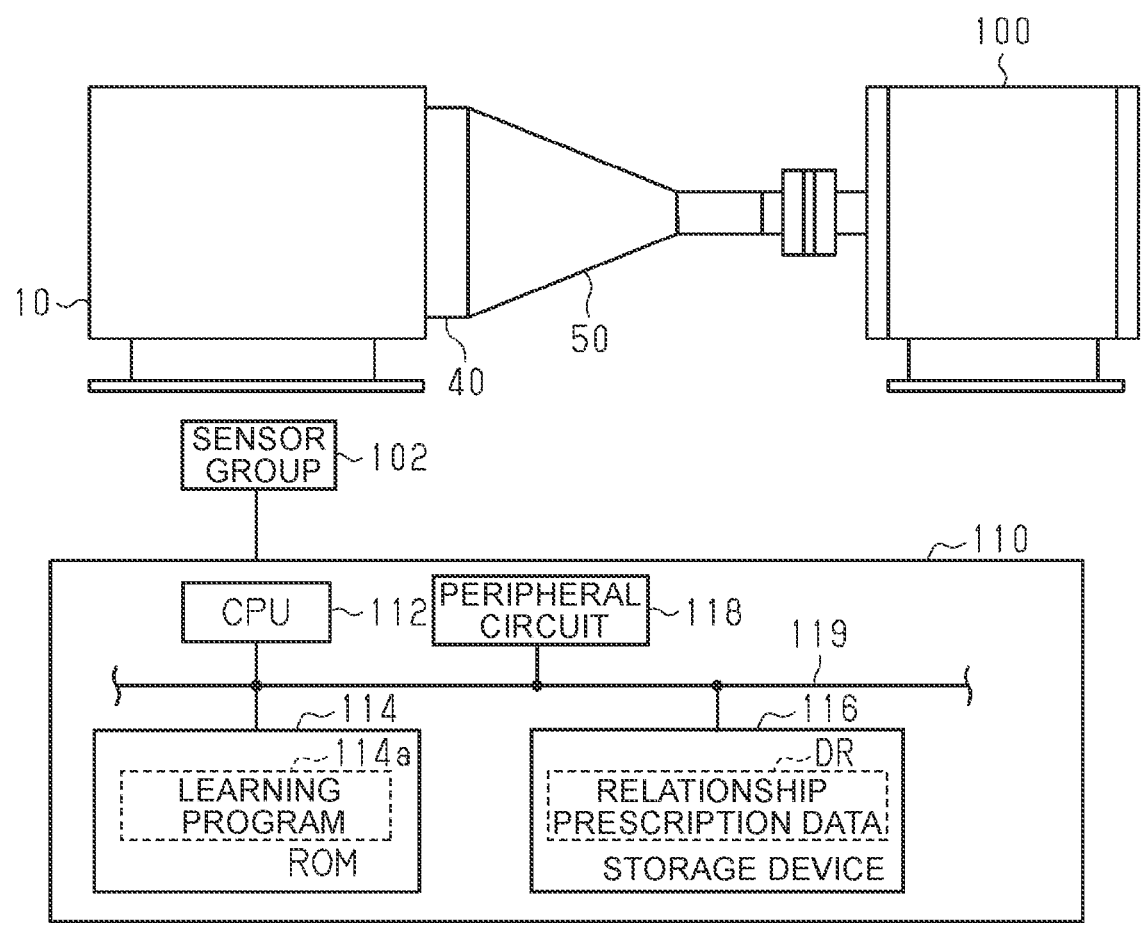
FIG. 3 illustrates a system that generates map data according to the embodiment.

The CPU 72 temporarily ends the sequence of processes indicated in FIG. 2 in the case where the process in S28 or S34 is completed. FIG. 3 illustrates a system that generates the steady map data DMs and the transient map data DMt.

In the present embodiment, as illustrated in FIG. 3, a dynamometer 100 is mechanically coupled to the crankshaft 28 of the internal combustion engine 10 via the torque converter 40 and the speed change device 50. Various state variables during operation of the internal combustion engine 10 are detected by a sensor group 102, and the detection results are input to a generation device 110 which is a computer that generates the steady map data DMs and the transient map data DMt. The sensor group 102 includes sensors mounted on the vehicle VC1 illustrated in FIG. 1 etc.

The generation device 110 includes a CPU 112, a ROM 114, a non-volatile memory (storage device 116) that is electrically rewritable, and a peripheral circuit 118, which can communicate with each other via a local network 119. The storage device 116 stores relationship prescription data DR which prescribe the relationship between the accelerator operation amount PA and the throttle opening degree command value TA* and the retardation amount aop. Meanwhile, the ROM 114 stores a learning program 114a for learning the relationship prescription data DR through reinforcement learning.

Figure 4:
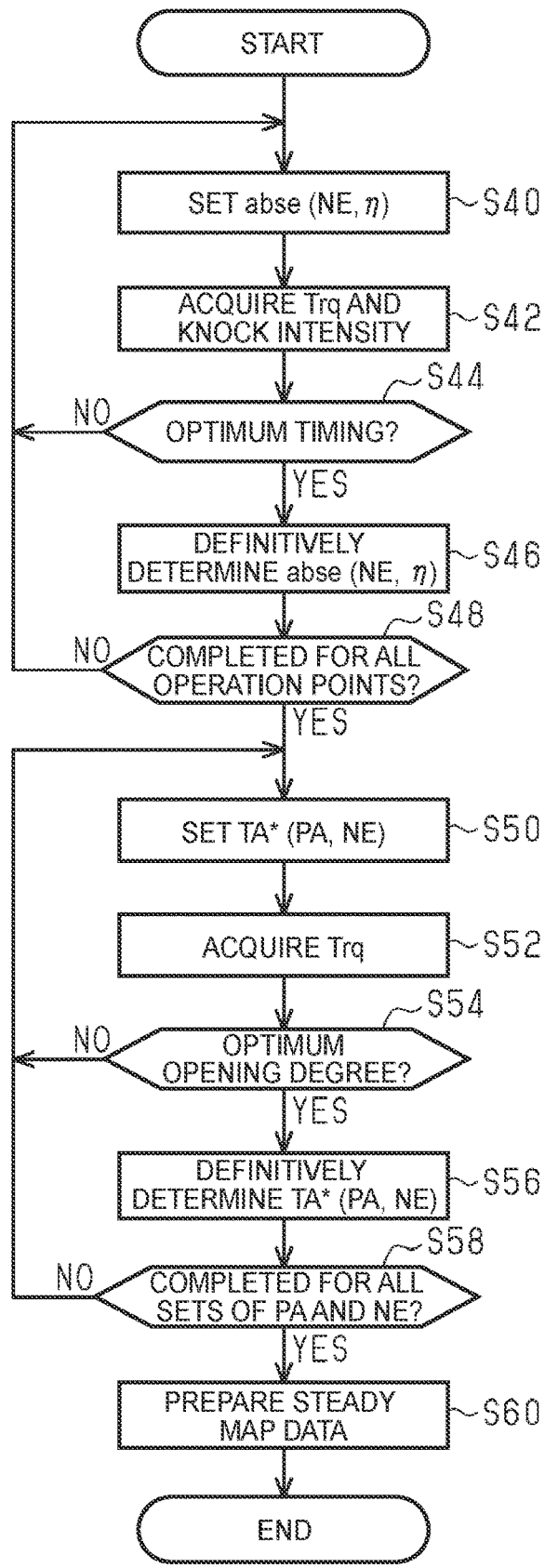
FIG. 4 is a flowchart illustrating the procedures of processes of generating steady map data according to the embodiment.

FIG. 4 illustrates the procedures of processes of generating the steady map data DMs. The processes indicated in FIG. 4 are implemented by the CPU 112 executing the learning program 114a stored in the ROM 114.

In the sequence of processes indicated in FIG. 4, the CPU 112 sets one reference ignition timing abse that matches the rotational speed NE and the charging efficiency η with the internal combustion engine 10 operating steadily, and operates the ignition device 26 such that the ignition timing corresponds to the reference ignition timing abse (S40). The value set here is one of a plurality of candidates determined in advance by an expert. The CPU 72 acquires torque Trq of the internal combustion engine 10 and a knock intensity from a knock sensor included in the sensor group 102 (S42). The torque Trq is calculated by the CPU 112 on the basis of load torque generated by the dynamometer 100 and the speed ratio of the speed change device 50. Next, the CPU 112 determines, on the basis of the torque Trq and the knock intensity, whether the reference ignition timing abse which is set in the process in S40 is an optimum timing (S44). The optimum timing refers to one of the MBT and knock limit ignition timings that is appropriate as the timing on the retarded side.

In the case where it is determined that the reference ignition timing abse is not an optimum timing (S44: NO), the CPU 112 returns to the process in S40, and sets the reference ignition timing abse to a different timing. In the case where it is determined that the reference ignition timing abse is an optimum timing (S44: YES), on the contrary, the CPU 112 definitively determines the ignition timing which is set in the process in S40 as the reference ignition timing abse (S46). The CPU 112 determines whether the process in S46 has been completed for all the operation points that are prescribed by the rotational speed NE and the charging efficiency η and that define the steady map data DMs (S48). In the case where it is determined that there is any operation point for which the process in S46 has not been completed yet (S48: NO), the CPU 112 returns to the process in S40.

In the case where it is determined that the process in S46 has been completed for all the operation points (S48: YES), on the contrary, the CPU 112 sets the throttle opening degree command value TA* which matches the accelerator operation amount PA and the rotational speed NE with the internal combustion engine 10 operating steadily (S50). The value set here is one of a plurality of candidates set in advance by an expert. The CPU 112 acquires torque Trq (S52), and determines, on the basis of the torque Trq, whether the throttle opening degree command value TA* which is set in the process in S50 corresponds to an optimum opening degree (S54). The CPU 112 may determine that the throttle opening degree command value TA* corresponds to an optimum opening degree in the case where the deviation between a torque command value Trq* which matches the accelerator operation amount PA and the torque Trq is sufficiently small. In the case where it is determined that the throttle opening degree command value TA* does not correspond to an optimum opening degree (S54: NO), the CPU 112 returns to the process in S50, and sets the throttle opening degree command value TA* to a different value.

In the case where it is determined that the throttle opening degree command value TA* corresponds to an optimum opening degree (S54: YES), on the contrary, the CPU 112 definitively determines the throttle opening degree command value TA* which is set in the process in S50 as a value that matches the accelerator operation amount PA and the rotational speed NE at that time (S56). The CPU 112 determines whether the process in S56 has been completed for all sets of the accelerator operation amount PA and the rotational speed NE that define the steady map data DMs (S58). In the case where it is determined that there is any set that has not been subjected to the process in S56 yet (S58: NO), the CPU 112 returns to the process in S50.

In the case where it is determined that the process in S56 has been completed for all such sets (S58: YES), on the contrary, the CPU 112 prepares steady map data DMs (S60). The CPU 112 temporarily ends the processes in FIG. 4 in the case where the process in S60 is completed.

Figure 5:
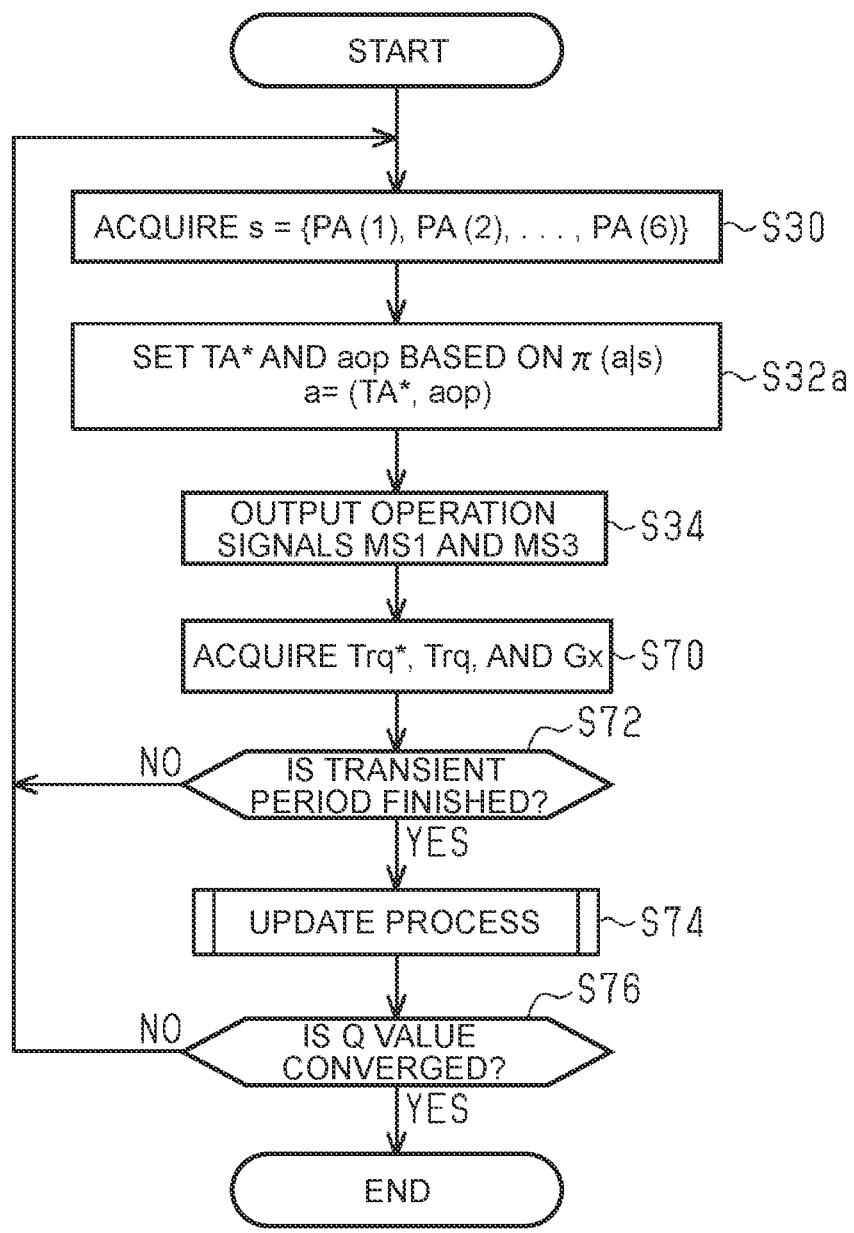
FIG. 5 is a flowchart illustrating the procedures of learning processes according to the embodiment.

FIG. 5 illustrates the procedure of pre-processing for generating the transient map data DMt. The processes indicated in FIG. 5 are implemented by the CPU 112 executing the learning program 114a stored in the ROM 114.

In the sequence of processes indicated in FIG. 5, the CPU 112 first acquires, as a state s, chronological data on the accelerator operation amount PA with the internal combustion engine 10 operating (S30). The chronological data are similar to the data which are used in the process in S30 indicated in FIG. 2. It should be noted, however, that the accelerator pedal 88 is not present in the system illustrated in FIG. 3. Therefore, the accelerator operation amount PA is considered as simulatively generated by the generation device 110 simulating the state of the vehicle VC1, and the accelerator operation amount PA which is simulatively generated is considered as a detection value of the state of the vehicle. The CPU 112 simulates the transient operation state of the internal combustion engine 10 by varying the accelerator operation amount PA.

Next, the CPU 112 sets an action a composed of the throttle opening degree command value TA* and the retardation amount aop which match the state s which is acquired in the process in S30 in accordance with a polity ζ determined by the relationship prescription data DR (S32a).

In the present embodiment, the relationship prescription data DR are data for determining an action value function Q and the policy π. In the present embodiment, the action value function Q is a table-type function that indicates the value of an expected profit that matches eight-dimensional independent variables of the state s and the action a. Meanwhile, the policy π determines a rule for preferentially selecting, given the state s, an action a (greedy action) that maximizes the action value function Q with the independent variables establishing the state s and selecting the other actions a at a predetermined probability ε.

Particularly, the number of values that the independent variables of the action value function Q according to the present embodiment may take is obtained by excluding, through human findings etc., some of all combinations of the values that the state s and the action a may take. That is, an event in which one of two adjacent sampled values of chronological data on the accelerator operation amount PA takes a minimum value while the other takes a maximum value, for example, could not be caused through a human operation of the accelerator pedal 88, and thus the action value function Q is not defined for such an event. In the present embodiment, the number of values that the state s which defines the action value function Q may take is limited to the fourth power of 10 or less, more preferably the third power of 10 or less, by reducing dimensionality on the basis of human findings etc.

Next, the CPU 112 outputs the operation signals MS1 and MS3 on the basis of the throttle opening degree command value TA* and the retardation amount aop which have been set (S34). Next, the CPU 112 acquires the torque Trq of the internal combustion engine 10, the torque command value Trq* for the internal combustion engine 10, and the acceleration Gx (S70). The CPU 112 calculates the torque Trq on the basis of the load torque which is generated by the dynamometer 100 and the speed ratio of the speed change device 50. In addition, the CPU 112 sets the torque command value Trq* in accordance with the accelerator operation amount PA. In addition, the CPU 112 calculates the acceleration Gx as a value assumed to act on the vehicle in the case where the internal combustion engine 10 etc. is mounted on the vehicle on the basis of the load torque etc. of the dynamometer 100. That is, in the present embodiment, the acceleration Gx which is also virtual is considered as a detection value of the state of the vehicle.

Next, the CPU 112 determines whether a transient period is finished (S72). The CPU 112 determines that the transient period is finished in the case where a state in which the absolute value of the amount of variation ΔPA in the accelerator operation amount PA per unit time is equal to or less than a prescribed amount that is less than the predetermined amount ΔPAth continues for a predetermined time after the absolute value of the amount of variation ΔPA per unit time is equal to or more than the predetermined amount ΔPAth. In the case where it is determined that the transient period has not been finished yet (S72: NO), the CPU 72 returns to the process in S30.

In the case where it is determined that the transient period has been completed (S72: YES), on the contrary, the CPU 112 considers that one episode has been completed, and updates the action value function Q through reinforcement learning (S74).

Figure 6:
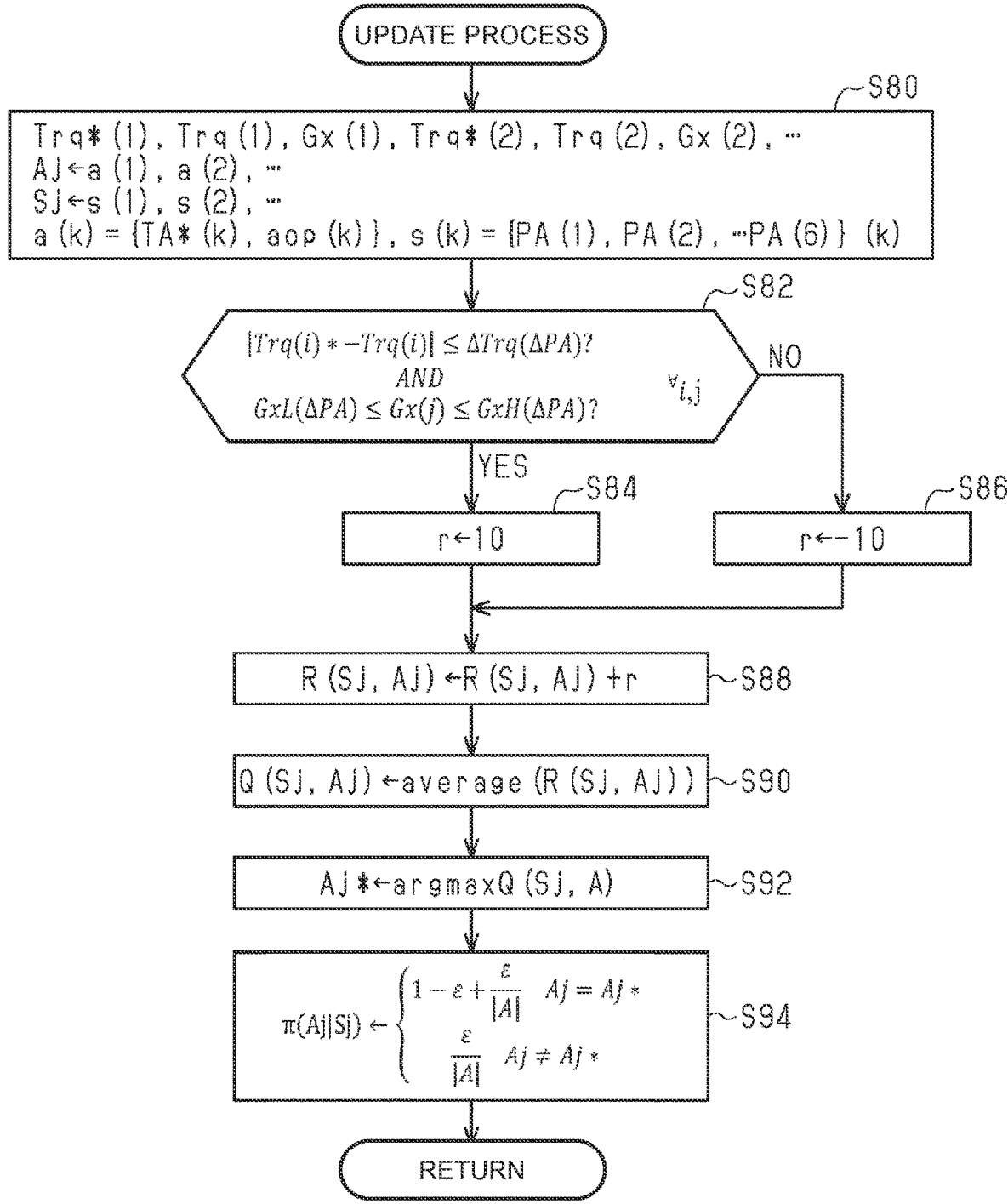
FIG. 6 is a flowchart illustrating the details of a part of the learning processes according to the embodiment.

FIG. 6 illustrates the details of the process in S74. In the sequence of processes indicated in FIG. 6, the CPU 112 acquires chronological data composed of sets of three sampled values of the torque command value Trq*, the torque Trq, and the acceleration Gx and chronological data on the state s and the action a during an episode that has been finished most recently (S80). In FIG. 6, values with different numbers in the parentheses are values of variables taken at different sampling timings. For example, a torque command value Trq* (1) and a torque command value Trq* (2) are taken at different sampling timings. In addition, chronological data on the action a that belong to the most recent episode are defined as an action set Aj, and chronological data on the state s that belong to the same episode are defined as a state set Sj.

Next, the CPU 112 determines whether the logical product of a condition (a) that the absolute value of the difference between any torque Trq and the torque command value Trq* that belong to the most recent episode is equal to or less than a prescribed amount ΔTrq and a condition (b) that the acceleration Gx is equal to or more than a lower limit value GxL and equal to or less than an upper limit value GxH is true (S82).

The CPU 112 variably sets the prescribed amount ΔTrq in accordance with the amount of variation ΔPA in the accelerator operation amount PA per unit time at the start of an episode. That is, in the case where the absolute value of the amount of variation ΔPA in the accelerator operation amount PA at the start of an episode is large, the CPU 112 determines that the episode relates to a transient time, and sets the prescribed amount ΔTrq to a large value compared to an episode that relates to a steady time.

In addition, the CPU 112 variably sets the lower limit value GxL in accordance with the amount of variation ΔPA in the accelerator operation amount PA at the start of the episode. That is, in the case where the episode relates to a transient time and the amount of variation ΔPA is positive, the CPU 112 sets the lower limit value GxL to a large value compared to the case where the episode relates to a steady time. In the case where the episode relates to a transient time and the amount of variation ΔPA is negative, meanwhile, the CPU 112 sets the lower limit value GxL to a small value compared to the case where the episode relates to a steady time.

In addition, the CPU 112 variably sets the upper limit value GxH in accordance with the amount of variation ΔPA in the accelerator operation amount PA per unit time at the start of the episode. That is, in the case where the episode relates to a transient time and the amount of variation ΔPA is positive, the CPU 112 sets the upper limit value GxH to a large value compared to the case where the episode relates to a steady time. In the case where the episode relates to a transient time and the amount of variation ΔPA is negative, meanwhile, the CPU 112 sets the upper limit value GxH to a small value compared to the case where the episode relates to a steady time.

In the case where it is determined that the logical product is true (S82: YES), the CPU 112 substitutes "10" into a reward r (S84). In the case where it is determined that the logical product is false (S82: NO), on the other hand, the CPU 72 substitutes "−10" into the reward r (S86). The CPU 112 updates the relationship prescription data DR which are stored in the storage device 116 illustrated in FIG. 3 in the case where the process in S84 or S86 is completed. In the present embodiment, an ε-soft on-policy Monte Carlo method is used.

That is, the CPU 112 adds the reward r to a profit R (Sj, Aj) which is determined by a set of each state and a corresponding action read in the process in S80 (S88). "R (Sj, Aj)" is a general expression of the profit R in which one of the elements of the state set Sj is used as the state and one of the elements of the action set Aj is used as the action. Next, the profit R (Sj, Aj) which is determined by the set of each state and the corresponding action read in the process in S80 is averaged and substituted into the corresponding action value function Q (Sj, Aj) (S90). The averaging may be a process of dividing the profit R, which is calculated in the process in S88, by the number of times the process in S88 is performed. The initial value of the profit R may be zero.

Next, the CPU 112 substitutes an action which is a set of the throttle opening degree command value TA* and the retardation amount aop into an action Aj* (S92). The substituted action is one obtained when the action value function Q (Sj, A) corresponding to the each state read in the process in S80 has the maximum value. "A" indicates any action that may be taken. The action Aj* may have different values in accordance with the type of the state which is read in the process in S80, but is denoted by the same symbol for simple notation.

Next, the CPU 72 updates the policy π (Aj|Sj) corresponding to each state read in the process in S80 (S94). That is, when the total number of actions is defined as "|A|", the probability of selecting the action Aj* which is selected in S92 is "1−ε+ε/|A|". In addition, the probability of selecting each of the "|A|−1" actions other than the action Aj* is "ε/|A|". The process in S94 is based on the action value function Q which has been updated in the process in S90, and thus the relationship prescription data DR which prescribe the relationship between the state s and the action a are updated so as to increase the profit R.

The CPU 112 temporarily ends the sequence of processes indicated in FIG. 6 in the case where the process in S94 is completed. Returning to FIG. 5, the CPU 112 determines whether the action value function Q is converged (S76) when the process in S74 is completed. Here, it may be determined that the action value function Q is converged in the case where the number of consecutive times the update amount of the action value function Q is equal to or less than a predetermined value for each of the independent variables reaches a predetermined number of times. In the case where it is determined that the action value function Q is not converged (S76: NO), the CPU 112 returns to the process in S30. In the case where it is determined that the action value function Q is converged (S76: YES), on the contrary, the CPU 112 ends the sequence of processes indicated in FIG. 5.

Figure 7:
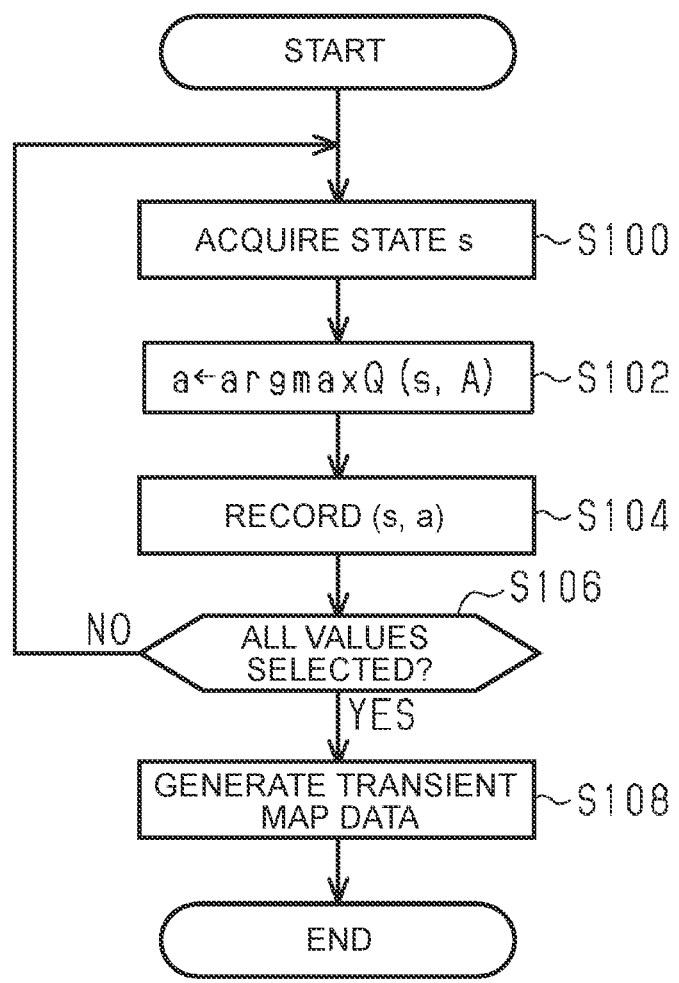
FIG. 7 is a flowchart illustrating the procedures of processes of generating transient map data according to the embodiment.

FIG. 7 illustrates the procedures of processes of generating the transient map data DMt on the basis of the action value function Q which is learned through the processes in FIG. 5, particularly, among the processes executed by the generation device 110. The processes indicated in FIG. 7 are implemented by the CPU 112 executing the learning program 114a stored in the ROM 114.

In the sequence of processes indicated in FIG. 7, the CPU 112 first selects one state s (S100). Next, the CPU 112 selects an action a that maximizes the value of the action value function Q from the action value function Q (s, A) corresponding to the state s (S102). That is, an action a is selected through a greedy policy. Next, the CPU 112 causes the storage device 116 to store a set of the state s and the action a (S104).

Next, the CPU 112 determines whether all the values of the input variables of the transient map data DMt have been selected in the process in S100 (S106). In the case where it is determined that there is any unselected value (S106: NO), the CPU 112 returns to the process in S100. In the case where all the values have been selected (S106: YES), on the contrary, the CPU 112 generates transient map data DMt (S108) on the basis of the data which are stored in the process in S104. Here, the values of the output variables corresponding to the values of the input variables of the transient map data DMt for the state s are determined as the corresponding action a.

The CPU 112 temporarily ends the sequence of processes indicated in FIG. 7 in the case where the process in S108 is completed. The functions and the effects of the present embodiment will be described.

In the system illustrated in FIG. 3, the CPU 112 adapts the steady map data DMs not through reinforcement learning. On the contrary, the CPU 112 generates the transient map data DMt by learning the action value function Q through reinforcement learning. That is, the CPU 112 acquires chronological data on the accelerator operation amount PA, and sets an action a composed of the throttle opening degree command value TA* and the retardation amount aop in accordance with the policy π. The CPU 72 explores an action a that maximizes the expected profit by selecting actions other than the action a that maximizes the expected profit at a predetermined probability ε. The CPU 112 selects an action that maximizes the action value function Q for each state to be used as an input variable of the transient map data DMt, and stores a set of the state and the action in the storage device 116. Next, the CPU 112 generates the transient map data DMt on the basis of the set of the state and the action which is stored in the storage device 116.

In the case where an expert adapts the transient map data DMt, he/she repeatedly performs the work of manually setting and evaluating candidates for the value of the output variable, which requires a large number of man-hours compared to the steady state. With the present embodiment, on the contrary, the number of man-hours spent by an expert can be reduced by utilizing reinforcement learning.

According to the present embodiment described above, the following effects can be further obtained.

(1) The storage device 76 of the control device 70 stores the transient map data DMt, rather than the action value function Q etc. Consequently, the CPU 72 sets the throttle opening degree command value TA* and the retardation amount aop on the basis of map computation performed using the transient map data DMt. Thus, the computation load can be reduced compared to the case where a process of selecting the action value function Q with the maximum value is executed.

(2) Chronological data on the accelerator operation amount PA are included in the independent variables of the action value function Q. Consequently, the value of the action a can be adjusted finely for various variations in the accelerator operation amount PA compared to the case where only a single sampled value of the accelerator operation amount PA is used as the independent variable.

(3) The throttle opening degree command value TA* itself is included in the independent variables of the action value function Q. Consequently, it is easy to enhance the degree of freedom in the exploration through reinforcement learning compared to the case where a parameter of a model formula obtained by modeling the behavior of the throttle opening degree command value TA* etc. is used as the independent variable related to the throttle opening degree, for example.

Second Embodiment

A second embodiment will be described below with reference to the drawings, mainly with regard to differences from the first embodiment.

Figure 8:
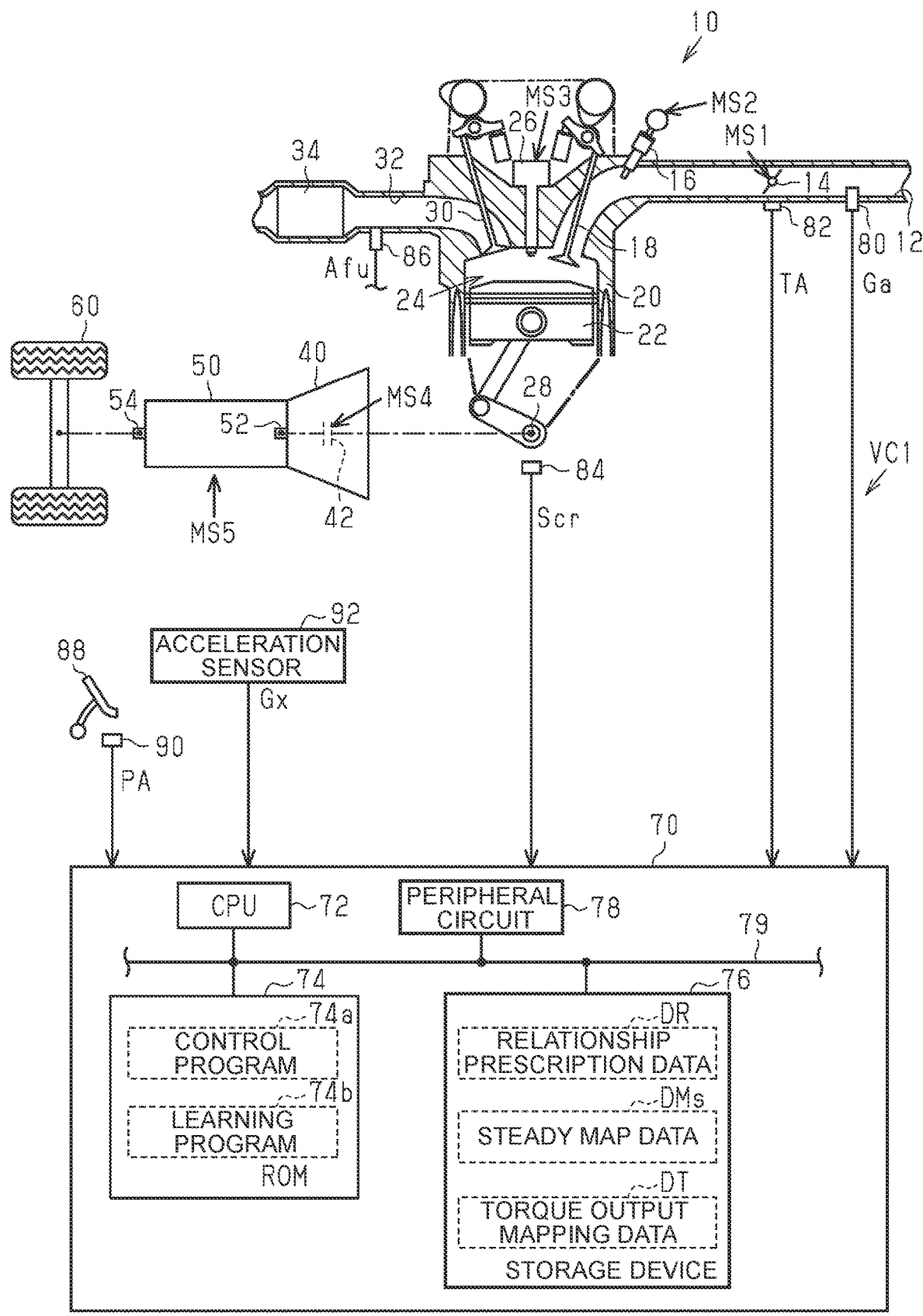
FIG. 8 illustrates a control device and a drive system according to a second embodiment.

FIG. 8 illustrates a drive system and a control device of the vehicle VC1 according to the present embodiment. In FIG. 8, members corresponding to the members illustrated in FIG. 1 are given the same reference numerals for convenience.

In the present embodiment, as illustrated in FIG. 8, the ROM 74 stores a learning program 74b in addition to the control program 74a. Meanwhile, the storage device 76 stores the steady map data DMs, but does not store the transient map data DMt, and instead stores the relationship prescription data DR, and also stores torque output mapping data DT. The relationship prescription data DR are learned data that have been learned in the processes in FIG. 5. Torque output mapping prescribed by the torque output mapping data DT is data related to a learned model such as a neural network, to which the rotational speed NE, the charging efficiency η, and the ignition timing are input and which outputs the torque Trq. The torque output mapping data DT may be learned using, as teacher data, the torque Trq which is acquired in the process in S70 when the processes in FIG. 5 are executed, for example.

Figure 9:
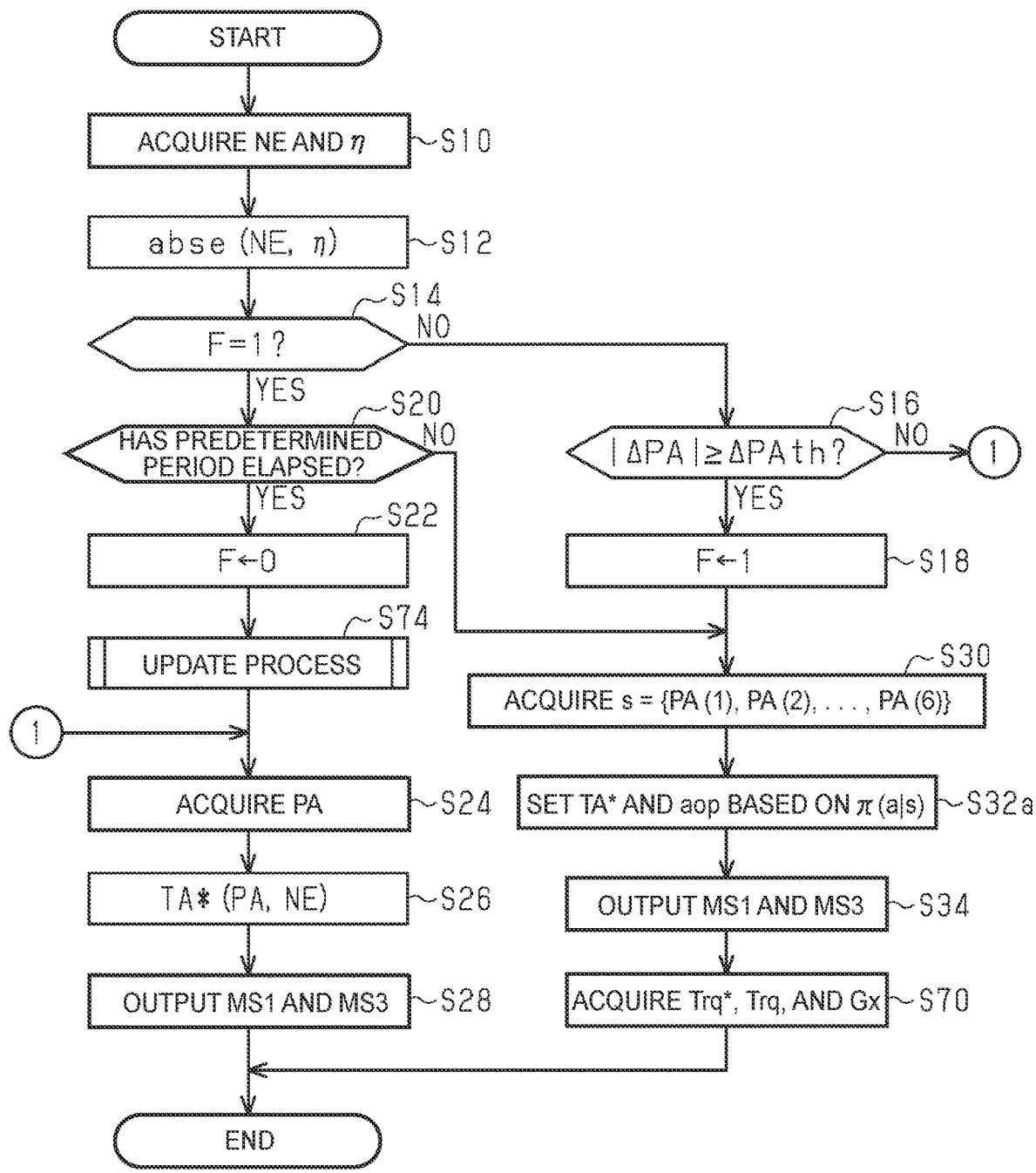
FIG. 9 is a flowchart illustrating the procedures of processes executed by the control device according to the embodiment.

FIG. 9 illustrates the procedures of processes executed by the control device 70 according to the present embodiment. The processes indicated in FIG. 9 are implemented by the CPU 72 executing the control program 74a and the learning program 74b, which are stored in the ROM 74, repeatedly at predetermined periods, for example. In FIG. 9, processes corresponding to the processes indicated in FIGS. 2 and 5 are given the same step numbers for convenience.

In the sequence of processes indicated in FIG. 9, in the case where the process in S30 is completed, the CPU 72 sequentially executes the processes in S32a, S34, and S70, and temporarily ends the sequence of processes indicated in FIG. 9. In the case where the process in S22 is completed, meanwhile, the CPU 72 executes the process in S74. In the case where the process in S74 is completed or in the case where a negative determination is made in the process in S16, the CPU 72 executes the processes in S24 to S28, and temporarily ends the sequence of processes indicated in FIG. 9. Incidentally, the processes in FIG. 9 other than the process in S74 are implemented by the CPU 72 executing the control program 74a, and the process in S74 is implemented by the CPU 72 executing the learning program 74b.

In this manner, with the present embodiment, with the control device 70 storing the relationship prescription data DR and the learning program 74b, the relationship prescription data DR can be updated along with the actual travel of the vehicle VC1, and thus the frequency of updating the relationship prescription data DR can be improved compared to the case of the first embodiment.

Third Embodiment

A third embodiment will be described below with reference to the drawings, mainly with regard to differences from the second embodiment.

Figure 10:
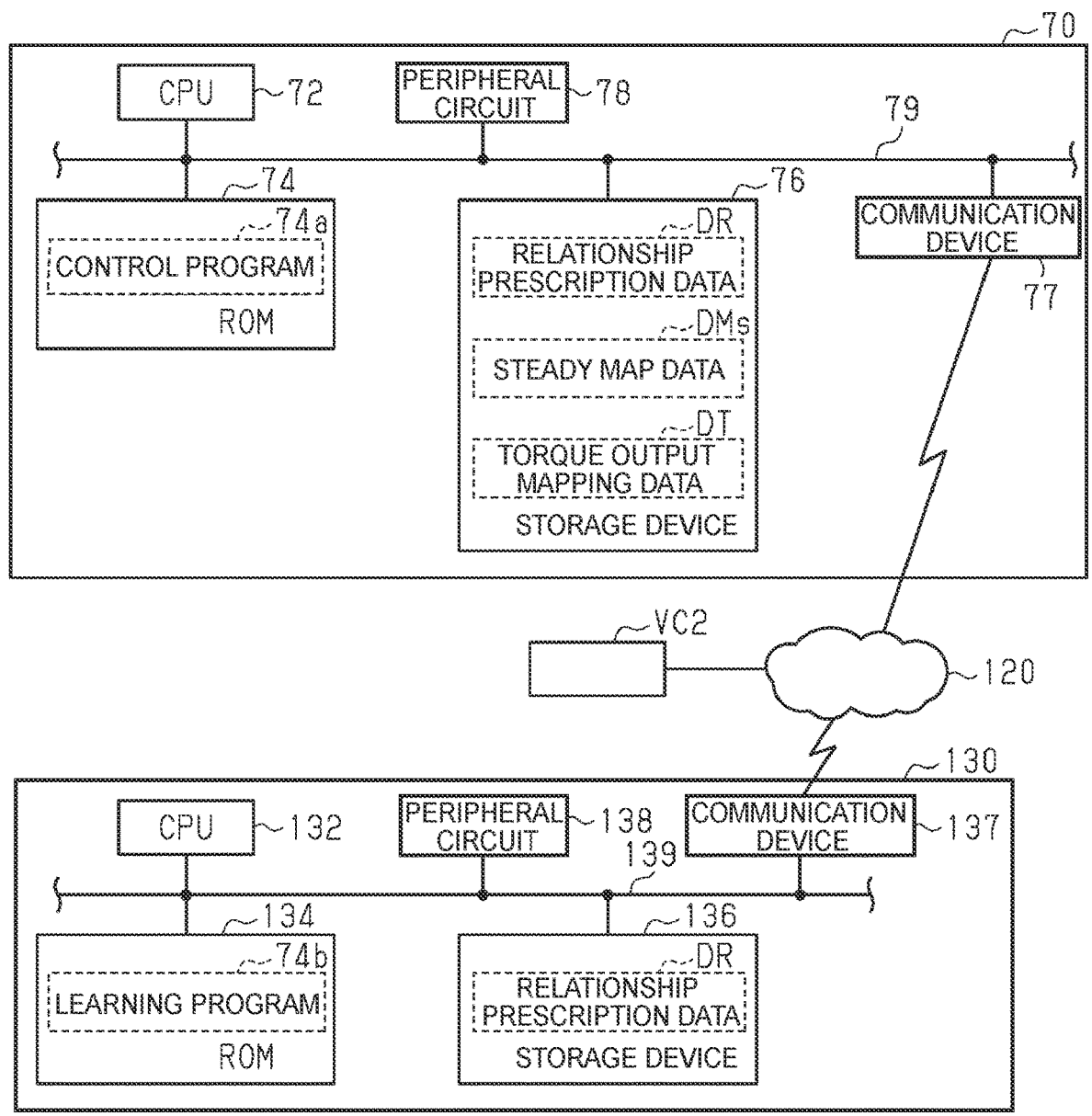
FIG. 10 illustrates the configuration of a system according to a third embodiment.

In the present embodiment, the relationship prescription data DR are updated outside the vehicle VC1. FIG. 10 illustrates the configuration of a control system that executes reinforcement learning according to the present embodiment. In FIG. 10, members corresponding to the members illustrated in FIG. 1 are given the same reference numerals for convenience.

The ROM 74 in the control device 70 in the vehicle VC1 illustrated in FIG. 10 stores the control program 74a, but does not store the learning program 74b. The storage device 76 also stores the steady map data DMs, the relationship prescription data DR, and the torque output mapping data DT. The steady map data DMs according to the present embodiment include data that include the charging efficiency η as an input variable and a base injection amount Qbse as an output variable, in addition to the data which include the reference ignition timing abse as an output variable and the data which include the throttle opening degree command value TA* as an output variable in the embodiments described above. In the data which include the charging efficiency η as an input variable and the base injection amount Qbse as an output variable, the base injection amount Qbse is set so as to bring the mixture of air and fuel corresponding to the charging efficiency η to the theoretical air-fuel ratio, and is a value obtained by multiplying the charging efficiency η by a predetermined proportional coefficient. The relationship prescription data DR according to the present embodiment include the throttle opening degree command value TA*, the retardation amount aop, and the base injection amount Qbse as action variables.

In addition, the control device 70 includes a communication device 77. The communication device 77 is a device that communicates with a data analysis center 130 via a network 120 that is external to the vehicle VC1. The data analysis center 130 analyzes data transmitted from a plurality of vehicles VC1, VC2, . . . . The data analysis center 130 includes a CPU 132, a ROM 134, a non-volatile memory (storage device 136) that is electrically rewritable, a peripheral circuit 138, and a communication device 137, which can communicate with each other via a local network 139. The ROM 134 stores the learning program 74b. The storage device 136 stores the relationship prescription data DR.

Figure 11:
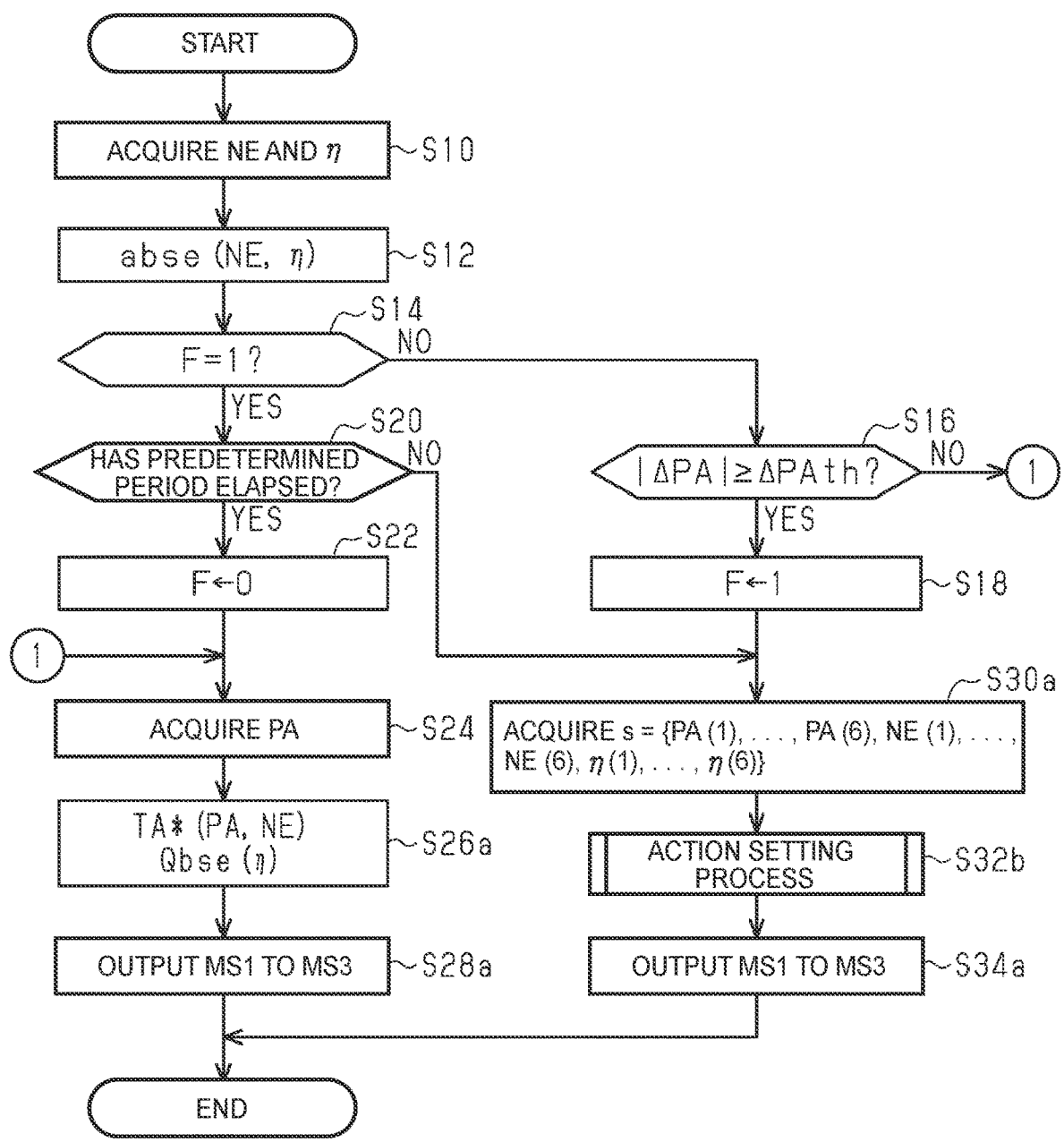
FIG. 11 is a flowchart illustrating the procedures of processes executed by the control device according to the embodiment.

FIG. 11 illustrates the procedures of processes executed by the control device 70 according to the present embodiment. The processes indicated in FIG. 11 are implemented by the CPU 72 executing the control program 74a, which is stored in the ROM 74, repeatedly at predetermined periods, for example. In FIG. 11, processes corresponding to the processes indicated in FIG. 9 are given the same step numbers for convenience.

In the sequence of processes indicated in FIG. 11, the CPU 72 proceeds to the process in S24 in the case where the process in S22 is completed or in the case where a negative determination is made in the process in S16. The CPU 72 performs map computation of the throttle opening degree command value TA* and the base injection amount Qbse on the basis of the steady map data DMs (S26a). The CPU 72 outputs the operation signal MS2 to the fuel injection valve 16 in order to operate the fuel injection valve 16 on the basis of the base injection amount Qbse, in addition to outputting the operation signals MS1 and MS3 as in the process in S28 (S28a). The CPU 72 generates the operation signal MS2 on the basis of a value obtained by correcting the base injection amount Qbse in accordance with an operation amount for controlling the detection value Afu to a target value through feedback control.

In the case where the process in S18 is completed, on the other hand, the CPU 72 acquires chronological data on the rotational speed NE and the charging efficiency η in addition to chronological data on the accelerator operation amount PA (S30a). In the present embodiment, chronological data on the accelerator operation amount PA, the rotational speed NE, and the charging efficiency η include six values sampled at equal intervals. Next, the CPU 72 sets an action a on the basis of the state s which is acquired in the process in S30a (S32b).

Figure 12:
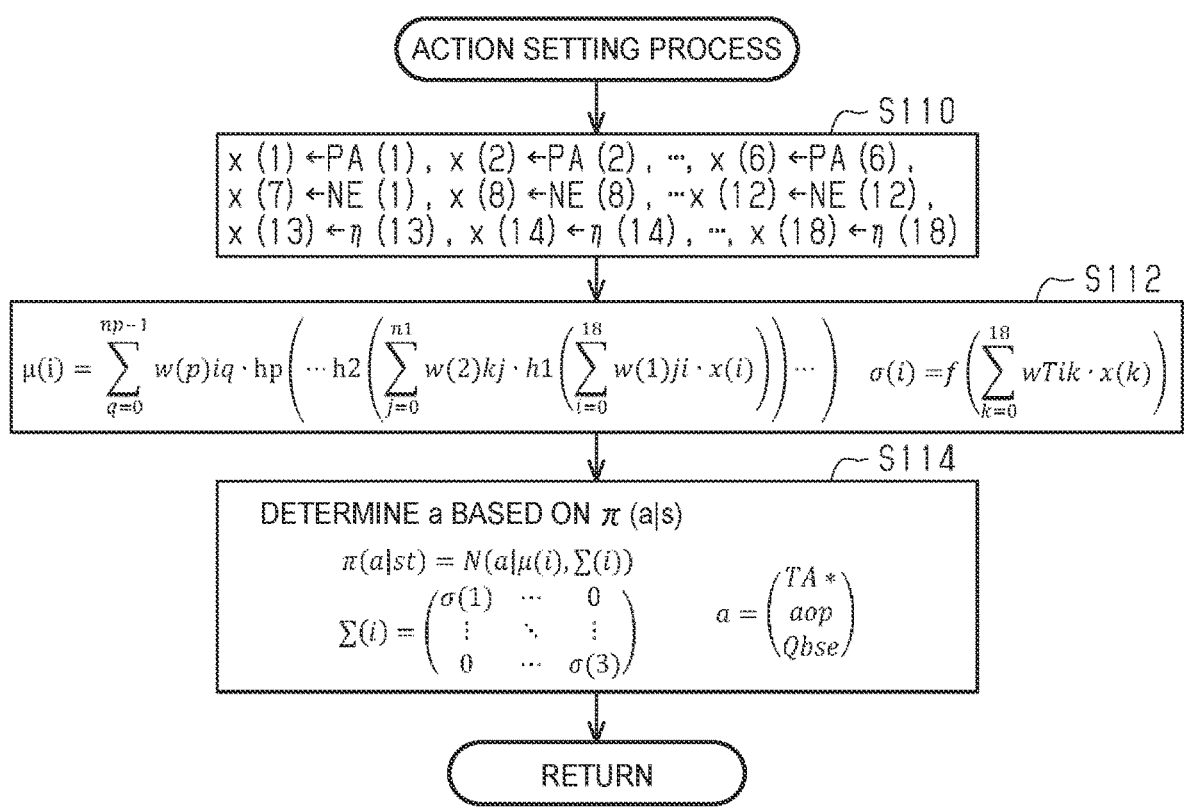
FIG. 12 is a flowchart illustrating the details of the procedures of a part of processes executed by the control device according to the embodiment.

FIG. 12 illustrates the details of the process in S32b. In the present embodiment, the policy π is multivariate Gaussian distribution which determines the probability that each operation amount that determines an action may take. An average value μ (1) of the multivariate Gaussian distribution indicates the average value of the throttle opening degree command value TA*. An average value μ(2) of the multivariate Gaussian distribution indicates the average value of the retardation amount aop. An average value μ (3) of the multivariate Gaussian distribution indicates the average value of the base injection amount Qbse. In the present embodiment, in addition, the covariance matrix of the multivariate Gaussian distribution is a diagonal matrix, and respective variances σ (i) corresponding to the average values μ (i) may take different values.

As indicated in FIG. 12, the CPU 72 substitutes the state s, which is acquired in the process in S30a, into input variables x (1) to x (18) of a function approximator for setting the policy π (S110). Particularly, the CPU 72 substitutes the accelerator operation amount PA (i) into the input variable x (i), the rotational speed NE (i) into the input variable x (6+i), and the charging efficiency η (i) into the input variable x (12+i), with "i=1 to 6".

Next, the CPU 72 calculates an average value μ (i) and a variance σ (i) for each of "i=1 to 3" (S112). In the present embodiment, the average value (i) is constituted by a neural network which has "p−1" intermediate layers and for which activation functions h1 to hp−1 of the intermediate layers are hyperbolic tangents and an activation function hp of an output layer is an ReLU. ReLU is a function that outputs one of the input and "0" that is not the smaller. If m=1, 2, . . . , p−1, the value of each node in the m-th intermediate layer is generated by inputting the output of linear mapping prescribed by a coefficient w (m) into an activation function hm. n1, n2, . . . , np−1 are the respective numbers of nodes in the first, second, . . . , p−1-th intermediate layers. For example, the value of each node in the first intermediate layer is generated by inputting, into an activation function h1, an output obtained by inputting the input variables x (1) to x (18) into linear mapping prescribed by a coefficient w (1) ji (j=0 to n1, i=0 to 18). Incidentally, w (1) j0 etc. are bias parameters, and the input variable x (0) is defined as "1".

The neural network outputs the average value μ (i) when the output of the activation function hp is input to linear mapping prescribed by a coefficient w (p) iq (i=1 to 3, q=0 to np−1).

In the present embodiment, in addition, the variance σ (i) is the value of a function f obtained by inputting, into the function f, each of values obtained by linearly transforming the input variables x (1) to x (18) using linear mapping prescribed by a coefficient wTik (i=1 to 3, k=1 to 18). In the present embodiment, an ReLU is used as the function f.

Next, the CPU 72 determines an action a on the basis of the policy π which is defined by the average value μ (i) and the variance σ (i) which are calculated in the process in S112 (S114). Here, the probability of selecting the average value (i) is the highest, and the probability of selecting the average value μ (i) is high in the case where the variance σ (i) is low compared to the case where the variance σ (i) is high.

The CPU 72 completes the process in S32b in FIG. 11 in the case where the process in S114 is completed. The CPU 72 outputs the operation signal MS2 to the fuel injection valve 16 in order to cause the fuel injection valve 16 to inject fuel for a value obtained by correcting the base injection amount Qbse, which is set in the process in S32b, using an operation amount for controlling the detection value Afu to a target value through feedback control, in addition to outputting the operation signals MS1 and MS3 as in the process in S34 (S34a).

Figure 13:
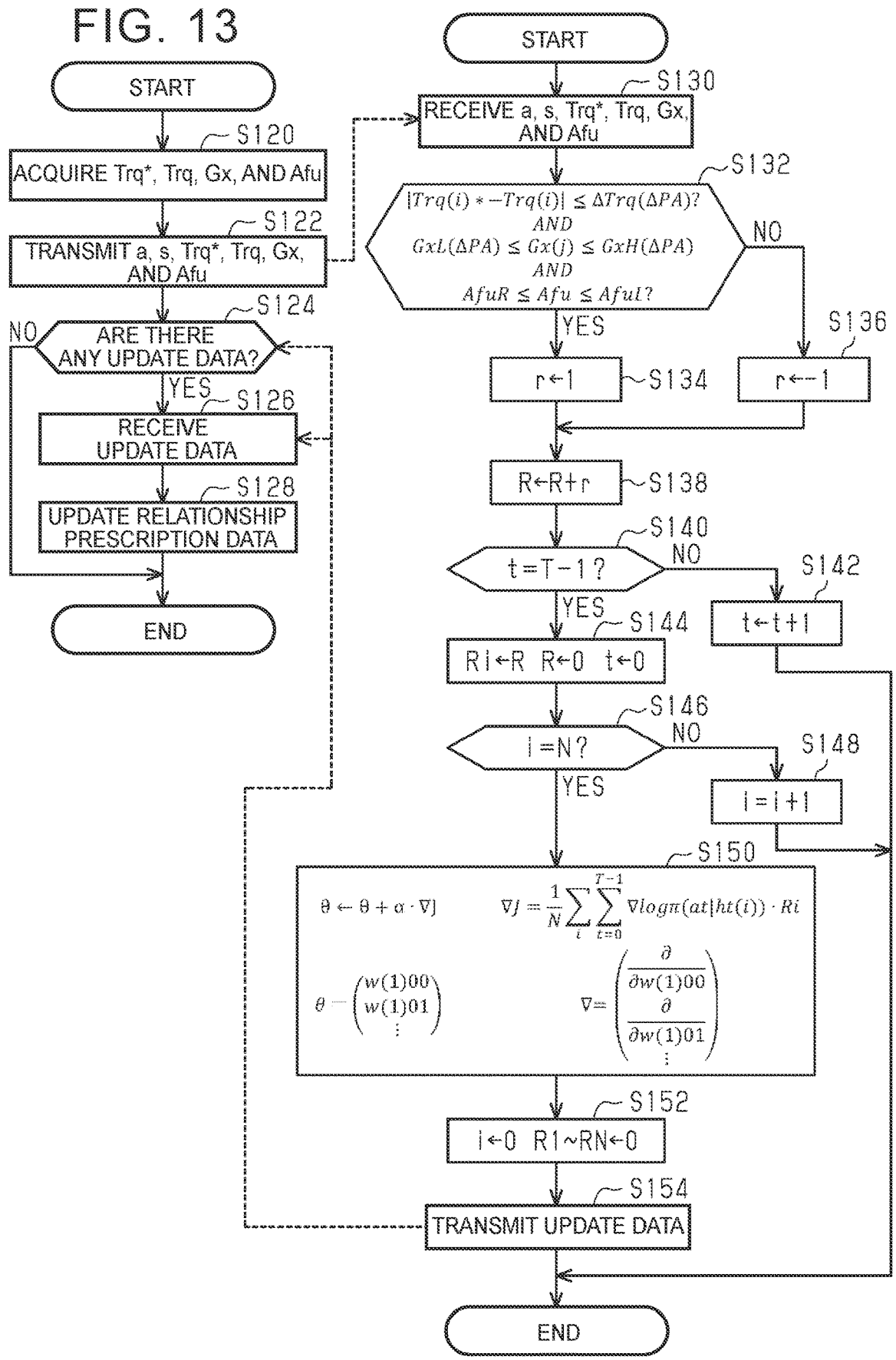
FIG. 13 is a flowchart illustrating the procedures of processes executed by the system according to the embodiment.

The CPU 72 temporarily ends the sequence of processes indicated in FIG. 11 in the case where the process in S28a or 34a is completed. FIG. 13 illustrate the procedures of processes for reinforcement learning according to the present embodiment. The processes indicated in left side of FIG. 13 are implemented by the CPU 72 executing the control program 74a which is stored in the ROM 74 illustrated in FIG. 10. Meanwhile, the processes indicated in right side of FIG. 13 are implemented by the CPU 132 executing the learning program 74b, which is stored in the ROM 134, repeatedly at periods of execution of the process in S34a in the case where the process in S34a is executed. The processes indicated in FIG. 13 will be described below along the chronological order of reinforcement learning.

As illustrated in left side of FIG. 13, the CPU 72 acquires the torque command value Trq*, the torque Trq, the acceleration Gx, and the detection value Afu (S120). Next, the CPU 72 operates the communication device 77 to transmit the data which are acquired in the process in S120 (S122).

Meanwhile, as illustrated in right side of FIG. 13, the CPU 132 receives the data which are transmitted in the process in S122 (S130). Next, the CPU 132 determines whether the logical product of the condition (a), the condition (b), and a condition (c) that the detection value Afu is equal to or more than a rich-side upper limit value AfR and equal to or less than a lean-side upper limit value AfL is true (S132).

In the case where it is determined that the logical product is true (S132: YES), the CPU 132 substitutes "1" into the reward r (S134). In the case where it is determined that the logical product is false (S132: NO), on the other hand, the CPU 132 substitutes "−1" into the reward r (S136). In the case where the process in S134 or S136 is completed, the CPU 132 adds the reward r to the profit R (S138). The CPU 132 determines whether a variable t has reached a predetermined time T−1 (S140). In the case where it is determined that the predetermined time T−1 has not been reached (S140: NO), the CPU 132 increments the variable t (S142).

In the case where it is determined that the predetermined time T−1 has been reached (S140: YES), on the contrary, the CPU 132 substitutes the profit R into a profit Ri, thereafter initializes the profit R, and further initializes the variable t (S144). Next, the CPU 132 determines whether a variable i has reached a predetermined value N (S146). In the case where it is determined that the predetermined value N has not been reached (S146: NO), the CPU 132 increments the variable i (S148).

In the case where it is determined that the predetermined value N has been reached (S146: YES), on the contrary, the CPU 132 updates variables w (1) to w (p) and a coefficient wT, which prescribe the policy π, through a policy gradient method (S150). In FIG. 13, the variables w (1) to w (p) and the coefficient wT which prescribe the policy π are collectively indicated as a parameter θ.

T sets of the state s, the action a, and the reward r with the variable t ranging from 0 to T−1 are defined as a trajectory ht. A probability pθ (ht) is defined as a probability pθ (ht) with which the trajectory ht is obtained in accordance with the policy π which is prescribed by the parameter θ. Here, an integral value of "pθ (ht)·Rt" with respect to the trajectory ht is an expected value (expected profit J) of the profit R (ht), and the parameter θ is updated so as to maximize the expected profit J. This is implemented by determining the update amount for each component of the parameter θ as being proportional to a value obtained by partially differentiating the expected profit J with respect to the component.

The probability pθ (ht) is represented, using the states s0, s1, . . . , sT and the actions a0, a1, . . . , aT, as follows.

$$p\theta(ht)=p(s0){\cdot}p(s1|s0,a0){\cdot}\pi(a0|s0){\cdot}p(s2|s1,a1){\cdot}\pi(a1|s1)$$
$$\ldots p(sT|sT-1,aT-1){\cdot}\pi(aT-1|sT-1)$$

It should be noted, however, that the initial probability p (s0) is the probability of the state s0, and that the transition probability p (st+1|st, at) is the probability of transition from the state st to the state st+1 at the time of the state st and the action at.

Thus, the partial differential of the expected profit J is represented by the following formula (c1).

[Expression 1]

$$\nabla J = \nabla \int p\theta(ht) \cdot R(ht) dht = \tag{c1}$$

-continued $$\int R(ht)p\theta(ht)\nabla \log p\theta(ht)dht = \int R(ht)p\theta(ht)\sum_{t=0}^{T-1}\nabla \log \pi(at\,|\,st)dht$$

The probability 0 (ht) cannot be known. Thus, the integral in the formula (c1) is replaced with an average value with a plurality (a predetermined number N) of trajectories ht.

Consequently, the partial differential of the expected profit J with respect to each component of the parameter θ is a value obtained by adding, for the predetermined value N of profits Ri, the product of the profit Ri and the sum of the partial differential coefficient of the logarithm of the policy π (at|ht (i)) with respect to the corresponding component of the parameter θ for "t=0 to T−1", and dividing the resulting sum by the predetermined value N.

A value obtained by multiplying the partial differential coefficient of the expected profit J with respect to each component of the parameter θ by the learning rate α is used as an update amount for the corresponding component of the parameter θ. The processes in S140 to S150 are implemented by executing an execution command, in the learning program 74b which is stored in the ROM 134, to execute update mapping, to which the states s0, s1, . . . , the actions a0, a1, . . . , and the reward r are input and which outputs the updated parameter θ.

In the case where the process in S150 is completed, the CPU 132 initializes the variable i and the profits R1 to RN (S152). The CPU 132 operates the communication device 137 to transmit the updated parameter θ (S154).

The CPU 132 temporarily ends the sequence of processes indicated in right side of FIG. 13 in the case where the process in S142, S148, or S154 is completed. Meanwhile, as illustrated in left side of FIG. 13, the CPU 72 determines whether there are any update data (S124). In the case where it is determined that there are any update data (S124: YES), the CPU 72 receives the update data (S126). The CPU 72 rewrites the coefficients w (1) to w (p) and wT, which constitute the relationship prescription data DR to be utilized in the process in S32b, with the data which are received in the process in S126 (S128). The CPU 72 temporarily ends the sequence of processes indicated in left side of FIG. 13 in the case where the process in S128 is completed or in the case where a negative determination is made in the process in S124.

Incidentally, the relationship prescription data DR which are installed in the control device 70 at the time of shipment of the vehicle VC1 are a learned model generated by the system illustrated in FIG. 3 executing processes that conform to the processes in FIGS. 12 and 13.

In this manner, with the present embodiment, the computation load on the CPU 72 can be reduced by the data analysis center 130 executing the process of updating the relationship prescription data DR. According to the present embodiment described above, the following functions and effects can be further obtained.

(4) The state and the action which are represented by continuous variables can be handled easily by using the relationship prescription data DR and a function approximator. (5) The action a includes the base injection amount Qbse. In a transient time, the detection value Afu may deviate from the range between the rich-side upper limit value AfR and the lean-side upper limit value AfL if the base injection amount Qbse as an open-loop operation amount is simply a value that is proportional to the charging efficiency η. A large number of man-hours are required for an expert in the case where he or she repeats trial and error to determine how to set the base injection amount Qbse. With the present embodiment, on the contrary, the number of man-hours required for an expert can be effectively reduced by learning the base injection amount Qbse, which is the injection amount for open-loop control in a transient time, through reinforcement learning.

Correspondence

The correspondence between the matters in the embodiments described above and the matters described in the "Summary" is as follows.

In the first aspect, the processor corresponds to the CPU 112 and the ROM 114. The storage device corresponds to the storage device 116. The acquiring corresponds to the processes in S30 and S70 in FIG. 5. The operating corresponds to the process in S34. The calculating a reward corresponds to the processes in S82 to S86. The updating corresponds to the processes in S88 to S94. The first data correspond to the relationship prescription data DR. The second data correspond to the steady map data DMs. The operation amount as an action variable corresponds to the throttle opening degree command value TA* and the retardation amount aop. The control mapping data correspond to the transient map data DMt. In the second aspect, the processor corresponds to the CPU 72 and the ROM 74 in FIG. 8. The storage device corresponds to the storage device 76 in FIG. 8. The first operation process corresponds to the process in S34 in FIG. 9. The second operation process corresponds to the process in S28 in FIG. 9. In the third aspect, the first processor corresponds to the CPU 72 and the ROM 74. The second processor corresponds to the CPU 132 and the ROM 134. The acquiring corresponds to the processes in S30a and S120. The updating corresponds to the process in S150.

Other Embodiments

The embodiments may be modified as follows. The embodiments and the following modifications can be combined with each other unless such embodiments and modifications technically contradict with each other.

Action Variable

While the throttle opening degree command value TA* is used as a variable related to the opening degree of the throttle valve as an action variable in the embodiments described above, an applicable embodiment of the present disclosure is not limited thereto. For example, the response of the throttle opening degree command value TA* to the accelerator operation amount PA may be expressed using a dead time and a second-order delay filter, and a total of three variables, namely the dead time and two variables that prescribe the second-order delay filter, may be used as variables related to the opening degree of the throttle valve. In that case, however, it is desirable that the state variable should be an amount of variation in the accelerator operation amount PA per unit time, rather than chronological data on the accelerator operation amount PA.

While the retardation amount aop is used as a variable related to the ignition timing as an action variable in the embodiments described above, an applicable embodiment of the present disclosure is not limited thereto. For example, the ignition timing to be corrected through KCS itself may be used as such a variable.

While a set of a variable related to the opening degree of the throttle valve and a variable related to the ignition timing and a set of a variable related to the opening degree of the throttle valve, a variable related to the ignition timing, and a variable related to the injection amount are used as action variables in the embodiments described above, an applicable embodiment of the present disclosure is not limited thereto. For example, regarding the three variables, namely a variable related to the opening degree of the throttle valve, a variable related to the ignition timing, and a variable related to the injection amount, only a variable related to the opening degree of the throttle valve and the fuel injection amount may be adopted, or only a variable related to the ignition timing and the fuel injection amount may be adopted. Regarding the three variables, further, only one of three such variables may be adopted as an action variable.

In the case where the internal combustion engine 10 includes a supercharger and a device that varies the valve characteristics of the suction valve as described in "internal Combustion Engine", the valve characteristics of the suction valve may be included as an action variable. In this case, an operation of the valve characteristics for enhancing the response in a transient time can be learned through reinforcement learning by giving a reward, considering that a predetermined criterion is met, in the case where the condition (a) or the condition (b) is met.

In the case of an internal combustion engine of a compression ignition type, as described in "Internal Combustion Engine", a variable related to the injection amount may be used in place of a variable related to the opening degree of the throttle valve, and a variable related to the injection timing may be used in place of a variable related to the ignition timing. It is desirable that a variable related to the number of times of injection in one combustion cycle or a variable related to the time interval between the end timing of one of two chronologically adjacent fuel injections for one cylinder in one cycle and the start timing of the other should be used in addition to a variable related to the injection timing.

In the case where the speed change device 50 is a stepped speed change device, for example, a current value etc. for a solenoid valve for adjusting the engagement state of a clutch using a hydraulic pressure may be used as an action variable. In the case where a hybrid vehicle, an electric vehicle, or a fuel cell vehicle is adopted as the vehicle as described in "Vehicle", for example, torque or output of the rotary electric machine may be used as an action variable.

State

While chronological data on the accelerator operation amount PA are data composed of six values sampled at equal intervals in the embodiments described above, an applicable embodiment of the present disclosure is not limited thereto. It is only necessary that the chronological data should be data composed of two or more values sampled at different sampling timings. In this event, it is desirable that the chronological data should be data composed of three or more sampled values, and that the chronological data should be data composed of values sampled at equal intervals.

While chronological data on the rotational speed NE are data composed of six values sampled at equal intervals in the embodiments described above, an applicable embodiment of the present disclosure is not limited thereto. It is only necessary that the chronological data should be data composed of two or more values sampled at different sampling timings. In this event, it is desirable that the chronological data should be data composed of three or more sampled values, and that the chronological data should be data composed of values sampled at equal intervals.

While chronological data on the charging efficiency η are data composed of six values sampled at equal intervals in the embodiments described above, an applicable embodiment of the present disclosure is not limited thereto. It is only necessary that the chronological data should be data composed of two or more values sampled at different sampling timings. In this event, it is desirable that the chronological data should be data composed of three or more sampled values, and that the chronological data should be data composed of values sampled at equal intervals.

In the case where a current value for a solenoid valve is used as an action variable as described in "Action Variable", for example, the state may include the rotational speed of the input shaft 52 of the speed change device, the rotational speed of the output shaft 54, and a hydraulic pressure regulated by the solenoid value. In the case where torque or output of the rotary electric machine is used as an action variable as described in "Action Variable", for example, the state may include the charge rate or the temperature of the battery.

First Data

While the action value function Q is a table-type function in the embodiments described above, an applicable embodiment of the present disclosure is not limited thereto. For example, a function approximator may also be used.

While the relationship prescription data DR which are installed in shipping the vehicle VC1 are data that have been learned by the system illustrated in FIG. 3 through reinforcement learning in the example illustrated in FIG. 10, an applicable embodiment of the present disclosure is not limited thereto. For example, the relationship prescription data DR to be installed may be generated by configuring the relationship prescription data DR to include the action value function Q and calculating, for the internal combustion engine 10 for which the map data have already been adapted through a conventional method, the action value function Q from the map data such that an action corresponding to each state is a greedy action.

Reduction of Dimensionality of Data in Table Format

The method of reducing the dimensionality of data in the table format is not limited to that described in relation to the embodiments described above. For example, it is rare for the accelerator operation amount PA to take a maximum value, and thus the action value function Q may not be defined for a state in which the accelerator operation amount PA is equal to or more than a prescribed amount and the throttle opening degree command value TA* etc. for the case where the accelerator operation amount PA is equal to or more than the prescribed amount may be adapted separately. In addition, dimensionality may be reduced by excluding such values an action may take that make the throttle opening degree command value TA* equal to or more than a prescribed value, for example.

In addition, in the process in S32*a*, the values of the independent variables of the action value function Q may be limited to a small number until an affirmative determination is made in the process in S76 in FIG. 5, for example. In that case, the processes in S30, S32*a*, S34, and S70 to S72 may be repeatedly performed with a value around an action a that increases the value of the action value function Q added to possible values of the independent variables of the action value function Q in the case where an affirmative determination is made in the process in S76.

It should be noted, however, that it is not essential to reduce dimensionality. For example, if reinforcement learning based on data on a plurality of vehicles has been performed and the computation capability of the CPU 72 and the storage capacity of the storage device 76 are sufficient in the third embodiment, the action value function may be learned for only some actions after a reduction of dimensionality before shipment of the vehicles, and all the actions may be made executable through exploration after the shipment. Consequently, it is possible to find a more appropriate action by increasing the number of actions that may be taken through exploration in view of the fact that sufficient learning data can be secured after the shipment compared to before the shipment.

Predetermined Condition

The predetermined condition as a condition for executing reinforcement learning or a condition for utilizing control data learned through reinforcement learning is not limited to a predetermined period since the absolute value of the amount of variation ΔPA in the accelerator operation amount PA becomes equal to or more than a predetermined amount ΔPAth. For example, the predetermined condition may be a predetermined period since the absolute value of an amount of variation in the suction air amount Ga per unit time becomes equal to or more than a predetermined amount.

The predetermined condition is not limited to a condition of being in a transient state. For example, the predetermined condition may be being in a fail-safe process in which an abnormality is caused in a predetermined electronic part or not being in such a fail-safe process.

Update Mapping

While an s-soft on-policy Monte Carlo method is used in the processes in S88 to S94, an applicable embodiment of the present disclosure is not limited thereto. For example, an off-policy Monte Carlo method may also be used. It should be noted, however, that an applicable embodiment of the present disclosure is not limited to using a Monte Carlo method. For example, an off-policy TD method, an on-policy TD method such as SARSA, or an eligibility trace method for on-policy learning may also be used.

In the case where a function approximator for the action value function Q is used as described in "First Data", the update mapping may be configured to include mapping that outputs an update amount of a parameter that prescribes the action value function Q on the basis of the partial differential of the action value function Q with respect to the parameter, for example.

While the profit Ri is a simple average for a time T in the process in S150, an applicable embodiment of the present disclosure is not limited thereto. For example, the profit Ri may be a sum obtained using values of the reward r that have been reduced by a predetermined reduction rate γ more significantly as the reward r is older. This corresponds to an exponential moving average process.

In the process in S150, the profit Ri may be replaced with a value obtained by subtracting an appropriate baseline function that does not depend on the parameter θ from the profit Ri. Specifically, it is desirable that the baseline function should be a function that minimizes the variance of the partial differential of the expected profit J with respect to the parameter, for example.

An applicable embodiment of the present disclosure is not limited to a configuration in which only one of the action value function Q and the policy π is directly updated in accordance with the reward r. For example, both the action value function Q and the policy π may be updated as in an actor critic method. The actor critic method is not limited thereto, and a value function V may be updated in place of the action value function Q, for example.

"ε" for determining the policy π is not limited to a fixed value, and may be changed in accordance with a rule determined in advance in accordance with the degree of progress of learning. The learning rate α is also not limited to a fixed value, and may be changed in accordance with a rule determined in advance in accordance with the degree of progress of learning.

Reward Calculation Process

While a reward is given in accordance with whether the logical product of the condition (a) and the condition (b) is true in the processes in FIG. 6, an applicable embodiment of the present disclosure is not limited thereto. For example, a process of giving a reward in accordance with whether the condition (a) is met and a process of giving a reward in accordance with whether the condition (b) is met may be executed. Alternatively, only one of the two processes, namely a process of giving a reward in accordance with whether the condition (a) is met and a process of giving a reward in accordance with whether the condition (b) is met, may be executed, for example.

While a reward is given in accordance with whether the logical product of the condition (a) to the condition (c) is true in the processes in FIG. 13, an applicable embodiment of the present disclosure is not limited thereto. For example, a process of giving a reward in accordance with whether the condition (a) is met, a process of giving a reward in accordance with whether the condition (b) is met, and a process of giving a reward in accordance with whether the condition (c) is met may be executed. Alternatively, only one of the three processes, namely a process of giving a reward in accordance with whether the condition (a) is met, a process of giving a reward in accordance with whether the condition (b) is met, and a process of giving a reward in accordance with whether the condition (c) is met, may be executed, for example.

A process of giving a large reward in the case where the absolute value of the difference between the torque Trq and the torque command value Trq* is small compared the case where the absolute value of such a difference is large may be performed, instead of giving a uniform reward, in the case where the condition (a) is met, for example. Alternatively, a process of giving a small reward in the case where the absolute value of the difference between the torque Trq and the torque command value Trq* is large compared the case where the absolute value of such a difference is small may be performed, instead of giving a uniform reward, in the case where the condition (a) is not met, for example.

A process of giving a reward that is variable in accordance with the acceleration Gx may be performed, instead of giving a uniform reward, in the case where the condition (b) is met, for example. Alternatively, a process of giving a reward that is variable in accordance with the acceleration Gx may be performed, instead of giving a uniform reward, in the case where the condition (b) is not met, for example.

A process of giving a reward that is variable in accordance with the detection value Afu may be performed, instead of giving a uniform reward, in the case where the condition (c) is met, for example. Alternatively, a process of giving a reward that is variable in accordance with the detection value Afu may be performed, instead of giving a uniform reward, in the case where the condition (c) is not met, for example.

The criterion related to the drivability is not limited to that discussed above, and may be set in accordance with whether noise or the vibration intensity meets a criterion, for example. It should be noted, however, that an applicable embodiment of the present disclosure is not limited thereto, and any one or more of four conditions, that is, whether the acceleration meets a criterion, whether the followability of the torque Trq meets a criterion, whether noise meets a criterion, and whether the vibration intensity meets a criterion, may be used, for example.

The reward calculation process is also not limited to a process of giving the reward r in accordance with whether a criterion related to the drivability is met or whether the exhaust characteristics meet a criterion. For example, the reward calculation process may be a process of giving a large reward in the case where the fuel consumption rate meets a criterion compared to the case where the fuel consumption rate does not meet the criterion. Any two or three of three processes, namely a process of giving a large reward in the case where a criterion related to the drivability is met compared to the case where such a criterion is not met, a process of giving a large reward in the case where the fuel consumption rate meets a criterion compared to the case where the fuel consumption rate does not meet the criterion, and a process of giving a large reward in the case where the exhaust characteristics meet a criterion compared to the case where the exhaust characteristics do not meet the criterion, may be included.

In the case where a current value for a solenoid valve of the speed change device 50 is used as an action variable as described in "Action", for example, the reward calculation process may include at least one of the following three processes (a) to (c), for example.

(a) A process of giving a large reward in the case where the time required for the speed change device to change the speed ratio falls within a predetermined time compared to the case where such a time exceeds the predetermined time.
(b) A process of giving a large reward in the case where the absolute value of the variation rate of the rotational speed of the input shaft 52 of the speed change device falls within a predetermined input-side value compared to the case where such an absolute value exceeds the predetermined input-side value.
(c) A process of giving a large reward in the case where the absolute value of the variation rate of the rotational speed of the output shaft 54 of the speed change device falls within a predetermined output-side value compared to the case where such an absolute value exceeds the predetermined output-side value. In the case where torque or output of the rotary electric machine is used as an action variable as described in "Action Variable", for example, a process of giving a large reward in the case where the charge rate of the battery falls within a predetermined range compared to the case where the charge rate thereof does not fall within such a range or a process of giving a large reward in the case where the temperature of the battery falls within a predetermined range compared to the case where the temperature thereof does not fall within such a range may be included.

Method of Generating Vehicle Control Data

While an action is determined on the basis of the action value function Q in the process in S32a in FIG. 5, an applicable embodiment of the present disclosure is not limited thereto. All the actions that may be taken may be selected with equal probabilities.

Operation Process

In the case where the action value function Q is a function approximator as described in "First Data", for example, an action a that maximizes the action value function Q may be selected by inputting, to the action value function Q, all sets of discrete values of the action as an independent variable of the table-type function in the embodiments described above together with the state s.

Control Mapping Data

The control mapping data to which the state of the vehicle is input and which output the value of the action variable that maximizes the expected profit by making one-to-one correspondence between the state of the vehicle and the value of the action variable that maximizes the expected profit are not limited to map data. For example, such data may be a function approximator. This can be implemented by using the average value μ after learning as the control mapping data in the case where the policy gradient method indicated in FIG. 13 etc. is used, for example.

Vehicle Control System

While the process (process in S32b) of determining an action based on the policy it is executed on the vehicle side in the example illustrated in FIG. 11, an applicable embodiment of the present disclosure is not limited thereto. For example, the vehicle VC1 may transmit the data which are acquired in the process in S30a, and the data analysis center 130 may determine an action a using the transmitted data, and transmit the determined action to the vehicle VC1.

The vehicle control system is not limited to that composed of the control device 70 and the data analysis center 130. For example, a portable terminal of a user may be used in place of the data analysis center 130. Alternatively, the vehicle control system may be composed of the control device 70, the data analysis center 130, and the portable terminal, for example. This configuration is implemented by the portable terminal executing the process in S32b, for example.

Processor

The processor is not limited to that including the CPU 72 (112, 132) and the ROM 74 (114, 134) to execute software processing. For example, the processor may include a dedicated hardware circuit (e.g. an ASIC etc.) that performs hardware processing for at least some of processes subjected to software processing in the embodiments described above. That is, the processor may have any of the following configurations (a) to (c). (a) The processor includes a processing device that executes all of the processes described above in accordance with a program and a program storage device, such as a ROM, that stores the program. (b) The processor includes a processing device that executes some of the processes described above in accordance with a program, a program storage device, and a dedicated hardware circuit that executes the remaining processes. (c) The processor includes a dedicated hardware circuit that executes all of the processes described above. The processor may be a software processor that includes a processing device and a program storage device, and there may be a plurality of dedicated hardware circuits.

Storage Device

While the storage device which stores the relationship prescription data DR and the storage device (ROM 74, 114, 134) which stores the learning program 74b, 114a and the control program 74a are separate storage devices in the embodiments described above, an applicable embodiment of the present disclosure is not limited thereto.

Internal Combustion Engine

The internal combustion engine is not limited to that including a port injection valve that injects fuel into the suction passage 12 as a fuel injection valve, and may include an in-cylinder injection valve that directly injects fuel into the combustion chamber 24, or may include both a port injection valve and an in-cylinder injection valve, for example.

The internal combustion engine may be provided with a device that varies the valve characteristics of the suction valve or a supercharger. The internal combustion engine is not limited to a spark-ignition internal combustion engine, and may be a compression-ignition internal combustion engine etc. which uses light oil etc. as fuel, for example.

Vehicle

The vehicle is not limited to a vehicle that includes only an internal combustion engine as a thrust generation device, and may be a so-called hybrid vehicle that includes an internal combustion engine and a rotary electric machine, for example. Alternatively, the vehicle may be a so-called electric vehicle or fuel cell vehicle that does not include an internal combustion engine but that includes a rotary electric machine as a thrust generation device.

What is claimed is:

1. A method executed using a processor and a storage device, the method comprising:
storing, in the storage device, first data that prescribes a relationship between a state of a vehicle and an action variable that indicates an action related to an operation of an electronic device in the vehicle when the state of the vehicle is in a transient operation;
by use of the processor, acquiring a detection value from a sensor that detects the state of the vehicle;
by use of the processor, operating the electronic device;
when the state of the vehicle is in the transient operation, by use of the processor:
calculating a first value to be larger in a case where a characteristic of the vehicle meets a criterion, on the basis of the acquired detection value, compared to a case where the characteristic does not meet the criterion, and
after the calculating of the first value, updating the first data using (1) the state of the vehicle which is based on the acquired detection value, (2) a value of the action variable which is used to operate the electronic device, and (3) the first value corresponding to the operation of the electronic device as inputs to an update mapping determined in advance, the update mapping outputting the first data which has been updated so as to increase a second value for a case where the electronic device is operated in accordance with the first data;
when the state of the vehicle is not in the transient operation, by use of the processor, obtaining second data by adapting the relationship between the state of the vehicle and the action variable without calculating the first value and updating the first data; and
by use of the processor, controlling at least one of an internal combustion engine, a torque converter, and a speed change device of the vehicle based upon the first data.

2. The method according to claim 1, wherein:
the vehicle is a vehicle on which the internal combustion engine is mounted;
the electronic device is configured to operate the internal combustion engine; and
the first data prescribes a relationship between the state of the vehicle and an operation amount of the internal combustion engine as the action variable.

3. The method according to claim 1, further comprising, by use of the processor, generating, on the basis of the updated first data, control mapping data to which the state of the vehicle is input and which output a value of the action variable that maximizes the second value by making one-to-one correspondence between the state of the vehicle and the value of the action variable that maximizes the second value.

4. The method according to claim 2, further comprising, by use of the processor, generating, on the basis of the updated first data, control mapping data to which the state of the vehicle is input and which output a value of the action variable that maximizes the second value by making one-to-one correspondence between the state of the vehicle and the value of the action variable that maximizes the second value.

5. The method according to claim 1, further comprising storing the second data in the storage device, wherein
the operating the electronic device includes, by use of the processor, executing a first operation process of operating the electronic device in accordance with a value of the action variable that matches the state of the vehicle which is based on the acquired detection value on the basis of the first data when the state of the vehicle is in the transient operation, and executing a second operation process of operating the electronic device in accordance with a value of the action variable that matches the state of the vehicle which is based on the acquired detection value on the basis of the second data when the state of the vehicle is not in the transient operation.

6. The method according to claim 2, further comprising storing the second data in the storage device, wherein
the operating includes, by use of the processor, executing a first operation process of operating the electronic device in accordance with a value of the action variable that matches the state of the vehicle which is based on the acquired detection value on the basis of the first data when the state of the vehicle is in the transient operation, and executing a second operation process of operating the electronic device in accordance with a value of the action variable that matches the state of the vehicle which is based on the acquired detection value on the basis of the second data when the state of the vehicle is not in the transient operation.

7. A vehicle control device comprising:
a storage device configured to store first data and second data that prescribe a relationship between a state of a vehicle and an action variable which is a variable related to an operation of an electronic device in the vehicle; and
a processor configured to
acquire a detection value from a sensor that detects the state of the vehicle,
operate the electronic device, and
when the state of the vehicle is in a transient operation:
calculate a first value to be larger in a case where a characteristic of the vehicle meets a criterion, on the basis of the acquired detection value, compared to a case where the characteristic does not meet the criterion, and
after the calculating of the first value, update the first data using (1) the state of the vehicle which is based on the acquired detection value, (2) a value of the action variable which is used to operate the electronic device, and (3) the first value corresponding to the operation as inputs to an update mapping determined in advance, wherein:
the update mapping outputs the first data which have has been updated so as to increase a second value for a case where the electronic device is operated in accordance with the first data;
the processor is configured to execute a first operation process of operating the electronic device in accordance with a value of the action variable that matches the state of the vehicle which is based on the acquired detection value on the basis of the first data when the state of the vehicle is in the transient operation;

the processor is configured to execute a second operation process of operating the electronic device in accordance with a value of the action variable that matches the state of the vehicle which is based on the acquired detection value on the basis of the second data when the state of the vehicle is not in the transient operation; and the processor is configured to control at least one of an internal combustion engine, a torque converter, and a speed change device of the vehicle based upon the first data.

8. The vehicle control device according to claim 7, wherein:

the vehicle is a vehicle on which the internal combustion engine is mounted;

the electronic device is configured to operate the internal combustion engine; and the first data prescribes a relationship between the state of the vehicle and an operation amount of the internal combustion engine as the action variable.

9. The vehicle control device according to claim 7, wherein the processor is configured to generate, on the basis of the updated first data, control mapping data to which the state of the vehicle is input and which output a value of the action variable that maximizes the second value by making one-to-one correspondence between the state of the vehicle and the value of the action variable that maximizes the second value.

10. The vehicle control device according to claim 8, wherein the processor is configured to generate, on the basis of the updated first data, control mapping data to which the state of the vehicle is input and which output a value of the action variable that maximizes the second value by making one-to-one correspondence between the state of the vehicle and the value of the action variable that maximizes the second value.

11. A vehicle control system comprising:

a storage device configured to store first data and second data that prescribe a relationship between a state of a vehicle and an action variable which is a variable related to an operation of an electronic device in the vehicle;

a first processor mounted on the vehicle; and a second processor disposed outside the vehicle, wherein:

the first processor is configured to acquire a detection value from a sensor that detects the state of the vehicle;

the first processor is configured to operate the electronic device;

when the state of the vehicle is in a transient operation:

the first processor or the second processor is configured to calculate a first value to be larger value in a case where a characteristic of the vehicle meets a criterion, on the basis of the acquired detection value, compared to a case where the characteristic does not meet the criterion; and after the calculating of the first value, the second processor is configured to update the first data using, (1) the state of the vehicle which is based on the acquired detection value, (2) a value of the action variable which is used to operate the electronic device, and (3) the first value corresponding to the operation as inputs to an update mapping determined in advance;

the update mapping outputs the first data which has been updated so as to increase a second value for a case where the electronic device is operated in accordance with the first data;

the first processor is configured to execute a first operation process of operating the electronic device in accordance with a value of the action variable that matches the state of the vehicle which is based on the acquired detection value on the basis of the first data when the state of the vehicle is in the transient operation;

the first processor is configured to execute a second operation process of operating the electronic device in accordance with a value of the action variable that matches the state of the vehicle which is based on the acquired detection value on the basis of the second data when the state of the vehicle is not in the transient operation; and the first processor is configured to control at least one of an internal combustion engine, a torque converter, and a speed change device of the vehicle based upon the first data.

* * * * *